US012015821B2

(12) United States Patent
Wang et al.

(10) Patent No.: US 12,015,821 B2
(45) Date of Patent: Jun. 18, 2024

(54) DISPLAY APPARATUS AND SIGNAL TRANSMISSION METHOD FOR DISPLAY APPARATUS

(71) Applicants: VIDAA USA, INC., Suwanee, GA (US); VIDAA (NETHERLANDS) INTERNATIONAL HOLDINGS B.V., RZ Duiven (NL)

(72) Inventors: Guilan Wang, Shandong (CN); Zhen Wang, Shandong (CN); Yuanyuan Huang, Shandong (CN); Huaipei Lu, Shandong (CN)

(73) Assignees: VIDAA USA, INC., Suwanee, GA (US); VIDAA (NETHERLANDS) INTERNATIONAL HOLDINGS B.V., Rz Duiven (NL)

( * ) Notice: Subject to any disclaimer, the term of this patent is extended or adjusted under 35 U.S.C. 154(b) by 0 days.

(21) Appl. No.: 18/066,896

(22) Filed: Dec. 15, 2022

(65) Prior Publication Data
US 2023/0119868 A1    Apr. 20, 2023

Related U.S. Application Data

(63) Continuation of application No. PCT/US2021/051317, filed on Sep. 21, 2021.

(30) Foreign Application Priority Data

Sep. 21, 2020  (CN) .......................... 202010994320.9
Oct. 10, 2020  (CN) .......................... 202011078145.5
Oct. 20, 2020  (CN) .......................... 202011124763.9

(51) Int. Cl.
*H04N 21/438*   (2011.01)
*G10L 15/22*    (2006.01)
(Continued)

(52) U.S. Cl.
CPC ......... *H04N 21/4383* (2013.01); *G10L 15/22* (2013.01); *H04N 21/482* (2013.01); *H04N 21/4882* (2013.01); *G10L 2015/223* (2013.01)

(58) Field of Classification Search
CPC ............. H04N 21/4383; H04N 21/482; H04N 21/4882; G10L 15/22
See application file for complete search history.

(56) References Cited

U.S. PATENT DOCUMENTS

2007/0016923 A1*  1/2007  Kwon ................ H04N 21/4383
                                                        725/38
2007/0288987 A1*  12/2007  Kim ........................ H04N 5/50
                                                        725/136

(Continued)

FOREIGN PATENT DOCUMENTS

CN    102196207 A    9/2011
CN    202512515 U    10/2012

(Continued)

OTHER PUBLICATIONS

International Search Report, mailed Dec. 23, 2021, from PCT/US2021/051317.

(Continued)

*Primary Examiner* — Mulugeta Mengesha
(74) *Attorney, Agent, or Firm* — ANOVA LAW GROUP, PLLC

(57) ABSTRACT

The embodiments of the present disclosure provide a display apparatus and a signal transmission method for the display apparatus. The display apparatus can use a voice assistant application to send received user voice to a voice assistant server, so that the voice assistant server can parse the user voice to obtain a channel switch instruction. In response to the channel switch instruction sent from the voice assistant server, the display apparatus receives an audio and video (Continued)

signal transmitted by a channel corresponding to the channel switch instruction, and plays the audio and video signal.

8 Claims, 23 Drawing Sheets

(51) Int. Cl.
*H04N 21/482* (2011.01)
*H04N 21/488* (2011.01)

(56) References Cited

U.S. PATENT DOCUMENTS

| | | |
|---|---|---|
| 2012/0259639 A1 | 10/2012 | Yeh et al. |
| 2014/0075480 A1 | 3/2014 | Williams et al. |
| 2014/0123185 A1* | 5/2014 | Nam .................. H04N 21/6582 725/38 |
| 2014/0195230 A1 | 7/2014 | Han et al. |
| 2014/0195243 A1 | 7/2014 | Cha et al. |

FOREIGN PATENT DOCUMENTS

| | | |
|---|---|---|
| CN | 103152614 A | 6/2013 |
| CN | 103501382 A | 1/2014 |
| CN | 103794212 A | 5/2014 |
| CN | 103885350 A | 6/2014 |
| CN | 105629747 A | 6/2016 |
| CN | 106997762 A | 8/2017 |
| CN | 107545892 A | 1/2018 |
| CN | 107635214 A | 1/2018 |
| CN | 107919123 A | 4/2018 |
| CN | 107924288 A | 4/2018 |
| CN | 107993657 A | 5/2018 |
| CN | 108040264 A | 5/2018 |
| CN | 108062952 A | 5/2018 |
| CN | 108228562 A | 6/2018 |
| CN | 108427580 A | 8/2018 |
| CN | 108683574 A | 10/2018 |
| CN | 304853267 S | 10/2018 |
| CN | 109218791 A | 1/2019 |
| CN | 109712624 A | 5/2019 |
| CN | 109791765 A | 5/2019 |
| CN | 109878434 A | 6/2019 |
| CN | 110650362 A | 1/2020 |
| CN | 111418216 A | 7/2020 |
| CN | 111466119 A | 7/2020 |

OTHER PUBLICATIONS

Chinese First Office Action, mailed Jan. 19, 2022, from Chinese App. No. 202011078145.5.
Chinese First Office Action, mailed Jan. 19, 2022, from Chinese App. No. 202010994320.9.
Chinese Second Office Action, mailed Aug. 23, 2022, from Chinese App. No. 202011078145.5.
Chinese Second Office Action, mailed Aug. 29, 2022, from Chinese App. No. 202010994320.9.

* cited by examiner

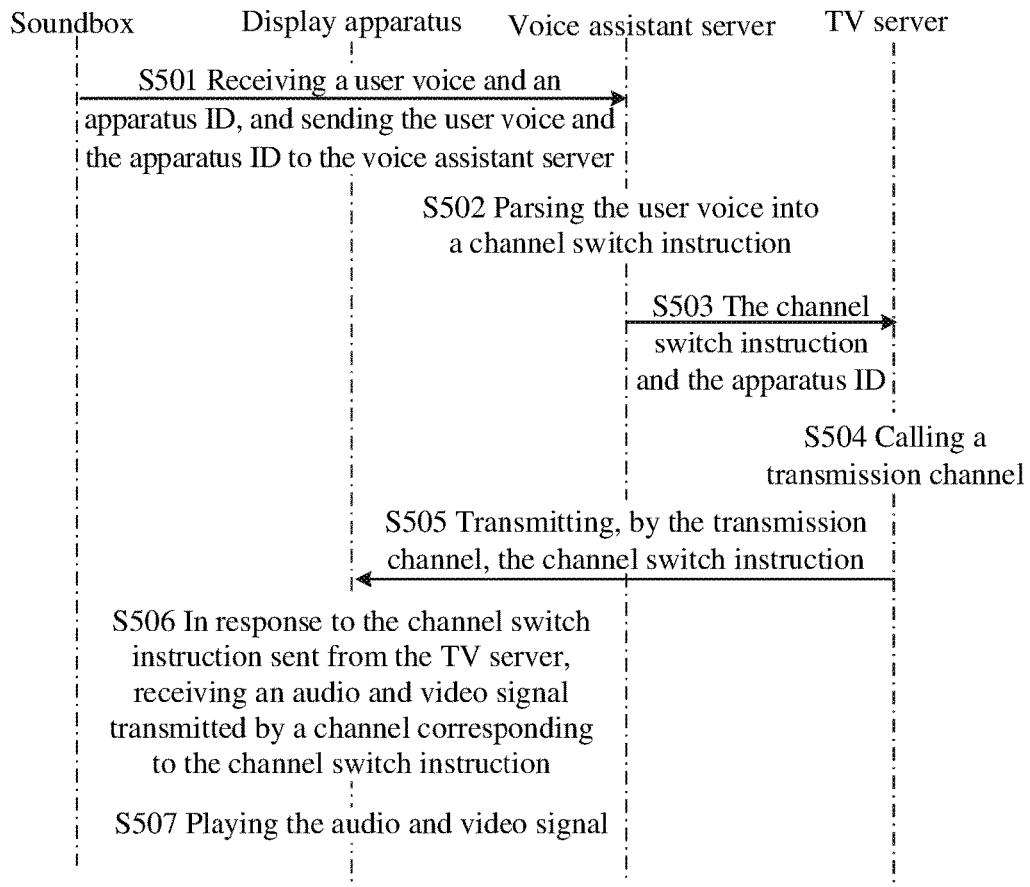

Fig. 14

In response to launch of a control application, displaying a display interface on a display, wherein the display interface is configured with at least one identifier control, and each identifier control is configured to load an identifier of an installed voice assistant — S1501

In response to a user's operation on one identifier control, controlling the display to display a setting page of a voice assistant corresponding to the identifier control, wherein if the voice assistant has been bound, the setting page is provided with a switch control so that a user can turn on or off the voice assistant based on the switch control disposed on the setting page — S1502

amazon alexa

Here are some contents you can try when using Alexa-enabled apparatuses:

Items to try

Alexa is set up and ready! For more data and access to other functions, please visit an Alexa app.

Display apparatus

Confirm

Fig. 18A 1 2 3 4

amazon alexa

Here are some contents you can try when using Alexa-enabled apparatuses:

Items to try

Alexa is set up and ready! For more data and access to other functions, please visit an Alexa app.

Living room display apparatus

Master bedroom display apparatus

Guest bedroom display apparatus

Confirm

Fig. 18B

| | System | |
|---|---|---|
| Image | Parents control | > |
| Sound | Language and site | > |
| Internet search | Time and date | > |
| Channel | Timing set | > |
| Auxiliary function | CEC set | > |
| System | Application set | > |
| Support | Voice function | > |
| | Customize | > |

DISPLAY APPARATUS AND SIGNAL TRANSMISSION METHOD FOR DISPLAY APPARATUS

CROSS REFERENCE TO RELATED APPLICATIONS

The present disclosure is a continuation of International Application No. PCT/US2021/051317, filed on Sep. 21, 2021, which claims the priorities of the Chinese Patent Applications No. 202010994320.9 filed on Sep. 21, 2020, No. 202011124763.9 filed on Oct. 20, 2020, and No. 202011078145.5 filed on Oct. 10, 2020, the entire contents of which are incorporated herein by reference.

FIELD

The present disclosure relates to display apparatuses, in particular to a display apparatus and a signal transmission method for the display apparatus.

BACKGROUND

A display apparatus refers to an apparatus that uses electronic technologies to play audio and video signals. The audio and video signals refer to mobile images and audio signals.

The audio and video signals played by the display apparatus may include: network audio and video signals received through a network interface, and wired audio and video signals received through a set-top box. The set-top box may receive wired audio and video signals transmitted by different satellites, and usually each satellite corresponds to a channel A user may control the display apparatus to play audio and video signals transmitted by different channels through a remote control.

SUMMARY

An embodiment of the present disclosure provides a display apparatus, including: a display and a controller; wherein the controller has a voice assistant application and is configured to: receive, by the voice assistant application, a user voice; send the user voice to a voice assistant server; in response to a channel switch instruction sent from the voice assistant server according to the user voice, receive an audio and video signal transmitted by a channel corresponding to the channel switch instruction; and play the audio and video signal.

The present disclosure further provides a display apparatus, including: a display; a user interface, configured to receive an instruction input from a user; and
  a controller, configured to: in response to launch of a control application, display a display interface on the display, wherein the display interface is configured with at least one identifier control, and each identifier control is configured to load an identifier of an installed voice assistant; and
  in response to a user's operation on one identifier control, control the display to display a setting page of the voice assistant corresponding to the identifier control, wherein if the voice assistant has been bound, the setting page is provided with a switch control so that the user can use the switch control to turn on or turn off the voice assistant.

In some implementations of the present disclosure, the controller is further configured to: if the voice assistant is not bound, in response to the user's operation on the identifier control, control the display to display a binding interface of the voice assistant so that the user can operate corresponding controls on the binding interface to realize binding of the voice assistant.

In some implementations of the present disclosure, the setting page is further provided with a first alert control. The controller is further configured to: if the voice assistant is not bound, in response to a user's operation on a first alert control, control the display to display a binding alert interface of the voice assistant, wherein the binding alert interface is configured to display alert information of a binding process of the voice assistant; and in response to a user's confirm operation, control the display to display the binding interface of the voice assistant so that the user can operate the corresponding controls on the binding interface to realize the binding of the voice assistant.

In some implementations of the present disclosure, the setting page is further provided with a second alert control, and in response to a user's operation on the second alert control, the display is controlled to display alert information, wherein the alert information is configured to display functions of the voice assistant.

In some implementations of the present disclosure, the controller is further configured as: each voice assistant may be bound with different display apparatuses.

The present disclosure further provides a display apparatus, including: a display; a user interface, configured to receive an instruction input from a user; and
  a controller, configured to: in response to a user's operation on a voice function control, display a display interface on the display, wherein the display interface is configured with at least one identifier control, and each identifier control is configured to load an identifier of an installed voice assistant; in response to a user's operation on one identifier control, control the display to display a setting page of the voice assistant corresponding to the control; if the voice assistant has been bound and a control application is in a launch state, the setting page is provided with a switch control so that the user can use the switch control to turn on or turn off the voice assistant.

In some implementations of the present disclosure, if the voice assistant is not bound, in response to the user's operation on the identifier control, the display is controlled to display a binding interface of the voice assistant so that the user can operate corresponding controls on the binding interface to realize binding of the voice assistant.

In some implementations of the present disclosure, the setting page is further provided with a first alert control. The controller is further configured to: if the voice assistant is not bound, in response to a user's operation on the first alert control, control the display to display a binding alert interface of the voice assistant, wherein the binding alert interface is configured to display alert information of a binding process of the voice assistant; if the control application is in a closed state, in response to a user's confirm operation, control the display to display a login interface of the control application so that the user can fill in user information on the login interface, thereby realizing launch of the control application; and in response to launch of the control application, control the display to display the binding interface of the voice assistant so that the user can operate the corresponding controls on the binding interface to realize the binding of the voice assistant.

The present disclosure further provides a display apparatus, including: a display, configured to display an alert interface; and a controller, connected with the display, wherein the controller is configured to: when there is a currently logged-in display apparatus with a duplicate name as a local device under a user account, and the currently logged-in display apparatus is not renamed, if a voice function of the local device is turned on, name the local device, and when it is detected that there is no other display apparatus with a duplicate name under the user account, turn on the voice function of the local device, wherein the local device refers to a device which has logged in with a user account and not turned on a voice function.

In some implementations of the present disclosure, the controller is configured to provide a name for the local device when the voice function of the local device is turned on, and turn on the voice function of the local device when it is detected that there is no other display apparatus with the duplicate name under the user account, and the controller is further configured to: in response to a voice function turnon instruction configured to turn on the voice function of the local device, display a naming alert interface on the display, wherein the naming alert interface is configured to realize naming of the local device; based on a new name, determined by the naming alert interface, of the local device, detect whether there are other display apparatuses with the duplicate name under the user account; and if there is no other display apparatus with the duplicate name under the user account, turn on the voice function of the local device.

In some implementations of the present disclosure, the controller is further configured to: if there are other display apparatuses with the duplicate name under the user account, display a duplicate name alert interface on the display, wherein a replacement control is displayed in the duplicate name alert interface; in response to that a user triggers the replacement control to generate a naming replacement instruction, generate a renaming alert interface and display the renaming alert interface on the display, wherein the renaming alert interface is configured to rename the local device; and if there is no other display apparatus with the duplicate name as the new name under the user account, turn on the voice function of the local device.

The present disclosure further provides a display apparatus, including: a display, configured to display an alert interface; and a controller, connected with the display, wherein the controller is configured to: when there is a currently logged-in display apparatus with a duplicate name as a local device under a user account, and the currently logged-in display apparatus is not renamed, receive a name replacement instruction sent from the currently logged-in display apparatus, wherein the local device refers to a device which has been logged in with the user account and turned on a voice function; in response to the name replacement instruction, turn off the voice function of the local device, generate a voice function turnoff alert interface, and display the voice function turnoff alert interface on the display, wherein the voice function turnoff alert interface is configured to indicate that the voice function of the local device is turned off; and if the voice function of the local device is restarted based on the voice function turnoff alert interface, name the local device, and when it is detected that there is no other display apparatus with the duplicate name under the user account, turn on the voice function of the local device.

In some implementations of the present disclosure, the controller is configured to restart the voice function of the local device based on the voice function turnoff alert interface, and is further configured to: receive a voice function setting instruction generated when a user triggers a setting control displayed in the voice function turnoff alert interface; and in response to the voice function setting instruction, generate a voice function turnon interface and display the voice function turnon interface on the display.

In some implementations of the present disclosure, the controller is configured to name the local device, and turn on the voice function of the local device when it is detected that there is no other display apparatus with a duplicate name under the user account, and is further configured to: in response to a voice function turnon instruction configured to turn on the voice function of the local device, display a naming alert interface on the display, wherein the naming alert interface is configured to realize naming of the local device; based on a new name, determined by the naming alert interface, of the local device, detect whether there are other display apparatuses with the duplicate name under the user account; and if there is no other display apparatus with the duplicate name under the user account, turn on the voice function of the local device.

In some implementations of the present disclosure, the controller is further configured to: if there are other display apparatuses with the duplicate name under the user account, display a duplicate name alert interface on the display, wherein a replacement control is displayed in the duplicate name alert interface; in response to that a user triggers the replacement control to generate a naming replacement instruction, generate a renaming alert interface and display the renaming alert interface on the display, wherein the renaming alert interface is configured to rename the local device; and if there is no other display apparatus with the duplicate name as the new name under the user account, turn on the voice function of the local device.

In some implementations of the present disclosure, the controller is further configured to: if the voice function of the local device is not returned on based on the voice function turnoff alert interface, cancel the display of the voice function turnoff alert interface.

BRIEF DESCRIPTION OF THE DRAWINGS

FIG. 14 is an interaction diagram of devices of a display system according to some embodiments.

FIG. 15 is an operation flowchart of a display apparatus according to some embodiments.

FIG. 18A is a schematic diagram of a binding interface according to some embodiments.

FIG. 18B is a schematic diagram of a binding interface according to some embodiments.

DETAILED DESCRIPTION OF THE EMBODIMENTS

In order to make the objectives, implementations, and advantages of the present disclosure clearer, the exemplary implementations of the present disclosure will be clearly and fully described below in combination with the accompanying drawings of the exemplary embodiments of the present disclosure. It is apparent that the described exemplary embodiments are some, but not all, embodiments of the present disclosure.

Based on the exemplary embodiments described in the present disclosure, all other embodiments obtained by those ordinary skilled in the art without involving any inventive effort are within the scope of the claims appended hereto. Moreover, while the present disclosure has been described in terms of one or more examples, it should be understood that various aspects of the disclosure may be individually incorporated into a complete implementation.

It should be noted that the brief description of terms in the present disclosure is intended merely to facilitate an understanding of the implementations described below and is not intended to limit the implementations of the present disclosure. Unless otherwise indicated, these terms should be understood in their ordinary and usual meanings.

The terms "first", "second", "third", and the like in the description and in the claims of the present disclosure and in the above drawings are configured to distinguish between similar or analogous objects or entities, and are not necessarily intended to define a particular order or sequential order, unless otherwise indicated. It should be understood that the terms so used are interchangeable under appropriate circumstances, such as being capable of operating in other sequences than those illustrated or described in connection with the embodiments of the present disclosure.

Furthermore, the terms "comprise", and "have", as well as any variations thereof, are intended to cover, but not exclusively. For example, a product or apparatus that includes a list of components is not necessarily limited to those components expressly listed, but may include other components not expressly listed or inherent to such product or apparatus.

The term "remote control", as used in the present disclosure, refers to a component of an electronic device (such as a display apparatus disclosed in the present disclosure), that can generally wirelessly control the electronic device over a short range of distances. The remote control is connected with the electronic device generally through infrared and/or radio frequency (RF) signals and/or Bluetooth, and may further include WiFi, a wireless USB, Bluetooth, a movement sensor, and other functional modules.

Figure 1:
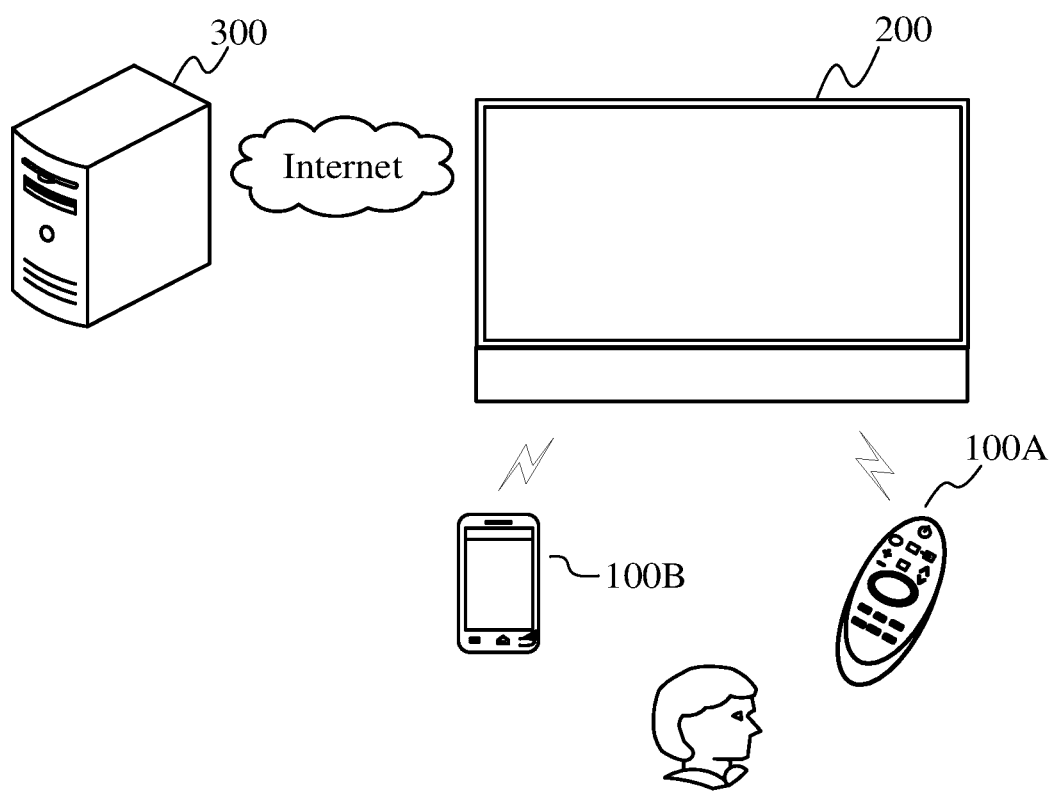
FIG. 1 is a schematic diagram of an operation scenario between a display apparatus and a control device.

FIG. 1 is a schematic diagram of an operation scenario between a display apparatus and a control device according to an embodiment. As provided in FIG. 1, a user may operate the display apparatus 200 through a mobile terminal 300 and the control device 100.

In some embodiments, the control device 100 may be a remote control, and communications between the remote control and the display apparatus include infrared protocol communications or Bluetooth protocol communications, and other short-distance communication methods, etc., and the display apparatus 200 is controlled by wireless or other wired methods. The user may control the display apparatus 200 by inputting a user instruction through keys on the remote control, voice input, a control panel, etc. For example, the user may input corresponding control instructions through volume plus and minus keys, a channel control, up/down/left/right movement keys, a voice input key, a menu key, an on-off key, and the like on the remote control, to achieve a function of controlling the display apparatus 200.

In some embodiments, mobile terminals, tablet computers, computers, notebook computers, and other smart devices may also be used to control the display apparatus 200. For example, an application running on a smart device is used to control the display apparatus 200. The application may be configured to provide users with various controls in an intuitive user interface (UI) on a screen associated with the smart device.

In some embodiments, software applications may be installed in the mobile terminal 300 and the display apparatus 200 to realize connection communication through a network communication protocol, thereby realizing the purposes of one-to-one control operation and data communication. For example, the mobile terminal 300 may be used to establish a control command protocol with the display apparatus 200, a remote control panel is synchronized to the mobile terminal 300, and the function of controlling the display apparatus 200 is realized by controlling a user interface on the mobile terminal 300. Audio and video content displayed on the mobile terminal 300 may also be transmitted to the display apparatus 200 to realize a synchronous display function.

As also provided in FIG. 1, the display apparatus 200 is further in data communication with a server 400 through a variety of communication methods. The display apparatus 200 may be allowed to perform communication connection through a local area network (LAN), a wireless local area network (WLAN), and other networks. The server 400 may provide various content and interactions for the display apparatus 200.

The display apparatus 200 may be a liquid crystal display, an OLED display, or a projection display apparatus. The specific type, size, resolution, etc. of the display apparatus are not limited, and those skilled in the art will appreciate that the display apparatus 200 may vary in performance and configuration as required.

In addition to providing a broadcast receiving TV function, the display apparatus 200 may additionally provide a computer-supported smart network TV function.

Figure 2:
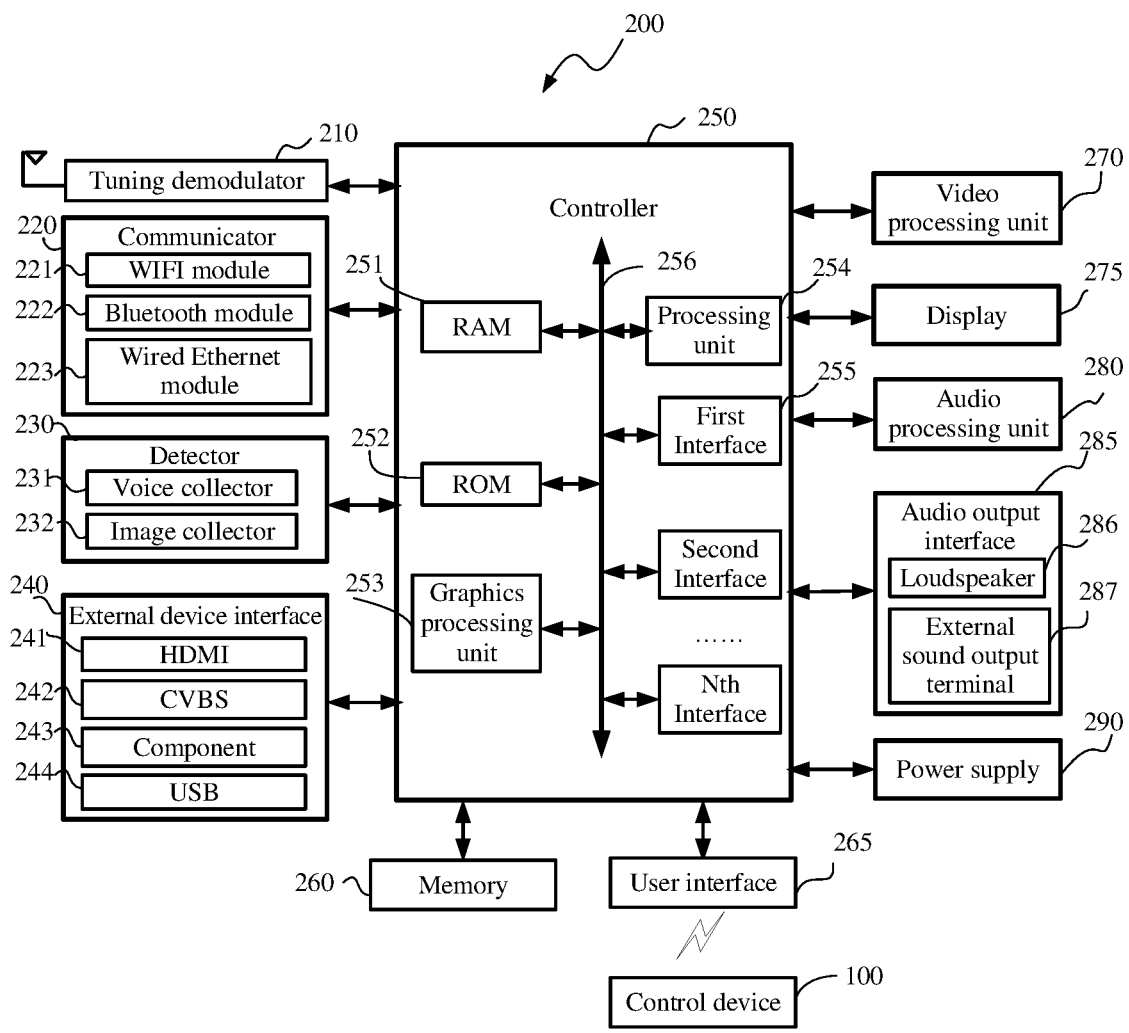
FIG. 2 is a block diagram of hardware configuration of a display apparatus 200.

FIG. 2 shows a block diagram of hardware configuration of the display apparatus 200 according to an exemplary embodiment.

In some embodiments, the display apparatus 200 includes at least one of a controller 250, a tuning demodulator 210, a communicator 220, a detector 230, an input/output interface 255, a display 275, an audio output interface 285, a memory 260, a power supply 290, a user interface 265, or an external device interface 240.

In some embodiments, the display 275 is a component configured to receive an image signal output from a first processing unit, and display video content and images as well as a menu control interface.

In some embodiments, the display 275 includes a display screen component configured to display images, and a driving component configured to drive displaying of the images.

In some embodiments, the display 275 is configured to present a control user interface (UI) generated in the display apparatus 200 and configured to control the display apparatus 200.

In some embodiments, depending on the type of the display 275, the display 275 further includes a driving component configured to drive display.

In some embodiments, the display 275 is a projection display, and may further include a projection apparatus and a projection screen.

In some embodiments, the communicator 220 is a component configured to communicate with an external device or an external server according to various communication protocol types. For example, the communicator may include at least one of a Wifi chip, a Bluetooth communication protocol chip, a wired Ethernet communication protocol chip or other network communication protocol chips or a near field communication protocol chip, or an infrared receiver.

In some embodiments, the display apparatus 200 may establish control signal and data signal transmission and reception with the external control device 100 or a content provider through the communicator 220.

In some embodiments, the user interface 265 may be configured to receive an infrared control signal of the control device 100 (such as an infrared remote control).

In some embodiments, the detector 230 is configured to collect a signal of the external environment or a signal interacting with the outside for the display apparatus 200.

In some embodiments, the detector 230 includes a light receiver, and a sensor configured to collect the intensity of ambient light, and may adaptively change display parameters and the like by collecting the ambient light.

In some embodiments, the detector 230 may further include an image collector, such as a camera and a video camera, which may be configured to collect external environment scenes, and to collect the attributes of a user or interact gestures with the user, and may adaptively change display parameters, and may also recognize user gestures to achieve the function of interaction with the user.

In some embodiments, the detector 230 may further include a temperature sensor or the like, and the temperature sensor is configured to, for example, sense the ambient temperature.

In some embodiments, the display apparatus 200 may adaptively adjust a display color temperature of an image. For example, when the temperature is relatively high, the display apparatus 200 may be adjusted to display an image with a cool color, or when the temperature is relatively low, the display apparatus 200 may be adjusted to display an image with a warm color.

In some embodiments, the detector 230 may further include a sound collector and the like, such as a microphone, which may be configured to receive a user's sound. Exemplarily, the sound collector is configured to collect a voice signal including a control instruction for the user to control the display apparatus 200, or collect environmental sounds to identify the type of an environmental scene so that the display apparatus 200 may adapt to environmental noise.

In some embodiments, as shown in FIG. 2, the input/output interface 255 is configured to perform data transmission between the controller 250 and other external devices or other controllers 250, such as receiving video signal data and audio signal data from the external device, or command instruction data, etc.

In some embodiments, the external device interface 240 may include, but is not limited to: any one or more of a high-definition multimedia interface (HDMI), an analog or data high-definition component input interface, a composite video input interface, a USB input interface, an RGB port, etc., and may also be a composite input/output interface formed by the above interfaces.

In some embodiments, the controller 250 and the tuning demodulator 210 may be located in different spit devices, that is, the tuning demodulator 210 may also be in an external device of a main device where the controller 250 is located, such as an external set-top box. In this way, the set-top box outputs a TV audio and video signal generated by modulating and demodulating a received broadcasting TV signal to the main device, and the main device receives the audio and video signal through a first input/output interface.

In some embodiments, the controller 250 controls the operation of the display apparatus and responds to user operations through various software control programs stored in the memory. The controller 250 may control the overall operation of the display apparatus 200. For example: in response to receiving a user command for selecting a UI object to be displayed on the display 275, the controller 250 may perform an operation related to the object selected by the user command.

As shown in FIG. 2, the controller 250 includes a random access memory (RAM) 251, a read-only memory (ROM) 252, a video processing unit 270, an audio processing unit 280, and others processing units 253, for example, at least one of a graphics processing unit (GPU), a central processing unit (CPU) 254, a communication interface, or a communication bus 256. The communication bus connects the various components.

In some embodiments, when a power-on signal is received, the power supply of the display apparatus 200 is started, and the CPU runs a system start instruction in the ROM 252 and copies temporary data of an operating system stored in the memory to the RAM 251, so as to start or run the operating system. After the operating system is started, the CPU copies temporary data of various applications in the memory to the RAM 251, so as to start or run the various applications.

In some embodiments, the CPU 254 is configured to execute an operating system instruction and application instructions stored in the memory, and to execute various applications, data and content by receiving various interactive instructions input from the outside, so as to finally display and play various audio and video content.

In some exemplary embodiments, the CPU 254 may include a plurality of processing units. The graphics processing unit 253 is configured to generate various graphics objects, such as icons, operating menus, and display graphics of a user input instruction.

In some embodiments, the video processing unit 270 is configured to receive an external video signal, and perform video processing according to a standard coding and decoding protocol of the input signal to obtain a signal that may be directly displayed or played on the display apparatus 200.

In some embodiments, the video processing unit 270 includes a demultiplexing module, a video decoding module, an image synthesis module, a frame rate conversion module, a display formatting module, and the like.

In some embodiments, the graphics processing unit 253 and the video processing unit may be integrated or separately disposed.

In some embodiments, the audio processing unit 280 is configured to receive an external audio signal, and process the signal according to a standard coding and decoding protocol of an input signal to obtain a sound signal that may be played in a loudspeaker.

In some embodiments, the video processing unit 270 may include one or a plurality of chips. The audio processing unit may also include one or a plurality of chips.

In some embodiments, the video processing unit 270 and the audio processing unit 280 may be separate chips, or may be integrated in one or a plurality of chips together with the controller.

In some embodiments, the audio output interface receives the sound signal output by the audio processing unit 280 under the control of the controller 250, includes a loudspeaker 286, a loudspeaker carried by the display apparatus 200 itself, and an external sound output terminal capable of being output to a generation device of an external device, such as an external sound interface or earphone interface, and may further include a near field communication module in the communication interface, for example, a Bluetooth module configured to output sound of a Bluetooth loudspeaker.

The power supply 290, under the control of the controller 250, provides power supply support for the display apparatus 200 with power input from an external power supply. The power supply 290 may include a built-in power supply circuit installed inside the display apparatus 200, or may also be a power supply installed outside the display apparatus 200. A power interface is provided in the display apparatus 200 for the external power supply.

The user interface 265 is configured to receive a user input signal, and then send the user input signal to the controller 250. The user input signal may be a remote control signal received through an infrared receiver, and various user control signals may be received through a network communication module.

In some embodiments, the user inputs a user command through the control device 100 or the mobile terminal 300, a user input interface receives user input, and the display apparatus 200 responds to the user input through the controller 250.

In some embodiments, the user may input the user command on a graphical user interface (GUI) displayed on the display 275, and the user input interface receives the input user command through the GUI. Alternatively, the user may input the user command by inputting a specific sound or gesture, and the user input interface recognizes the sound or gesture through a sensor to receive the input user command.

The memory 260 includes various software modules stored to drive the display apparatus 200. For example, various software modules stored in a first memory include: at least one of a basic module, a monitoring module, a communication module, a display control module, a browser module, or various service modules.

For example, a voice recognition module includes a voice parsing module and a channel switch instruction database module. The display control module is a module configured to control the display to display image content, and may be configured to play information such as multimedia image content and the UI. The communication module is a module configured to be in control and data communication with the external device. The browser module is a module configured to perform data communication between browsing servers. The service modules are modules configured to provide various services and various applications. At the same time, the memory 260 is further configured to store and receive external data and user data, images of various items in various user interfaces, and visual effect diagrams of focus objects, etc.

Figure 3:
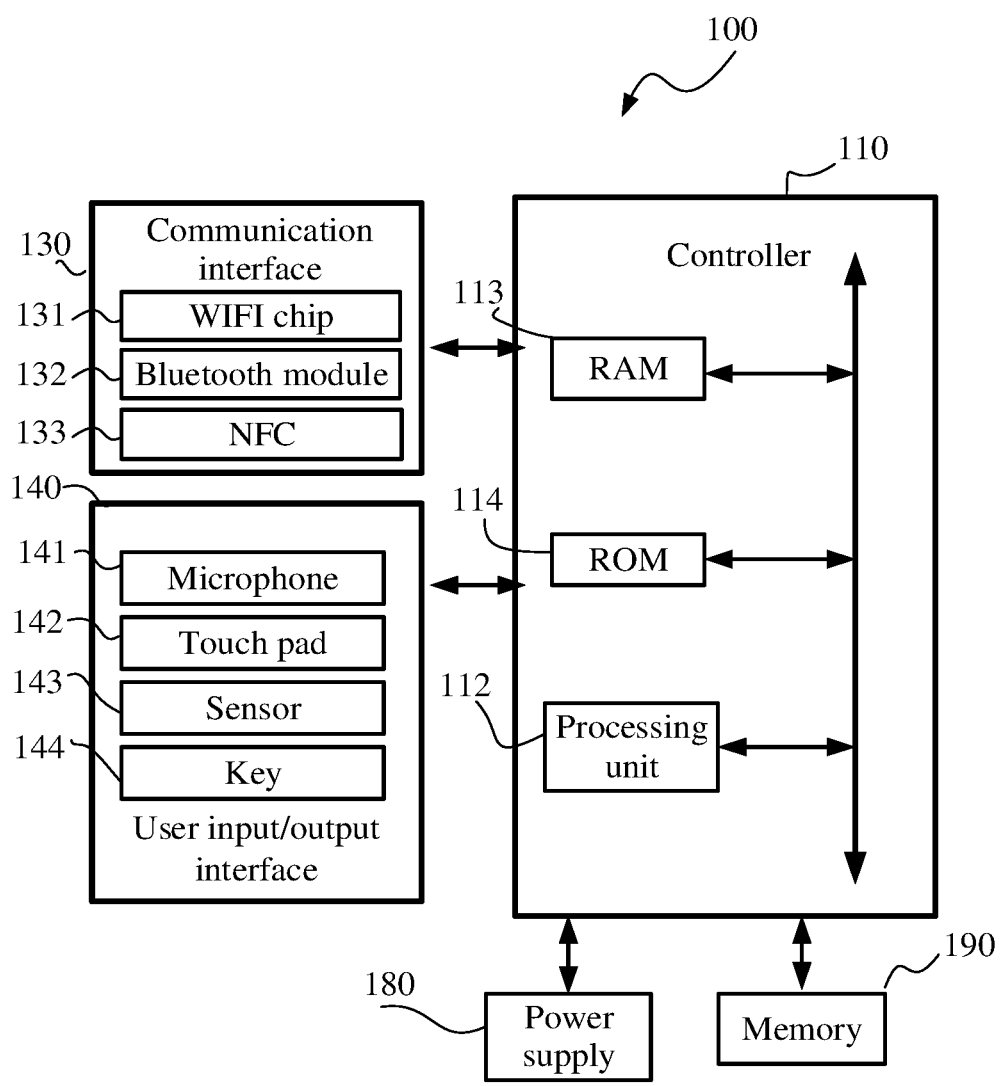
FIG. 3 is a block diagram of hardware configuration of a control device 100.

FIG. 3 is a configuration block diagram of the control device 100 according to an exemplary embodiment. As shown in FIG. 3, the control device 100 includes a controller 110, a communication interface 130, a user input/output interface, a memory, and a power supply.

The control device 100 is configured to control the display apparatus 200 and may receive operation instructions input from the user and convert the operation instructions into instructions that the display apparatus 200 may recognize and respond to, thereby serving as an intermediary role for interaction between the user and the display apparatus 200. For example, the user operates channel plus or minus keys on the control device 100, and the display apparatus 200 responds to the channel plus and minus operations.

In some embodiments, the control device 100 may be a smart device. For example, the control device 100 may be provided with various applications configured to control the display apparatus 200 according to user requirements.

In some embodiments, as shown in FIG. 1, the mobile terminal 300 or other smart electronic devices may perform similar functions as the control device 100 after being provided with the applications configured to control the display apparatus 200. The controller 110 includes a processing unit 112, a RAM 113, a ROM 114, a communication interface 130, and a communication bus. The controller is configured to control running and operation of the control device 100, as well as communication and cooperation between internal components, and external and internal data processing.

The communication interface 130 realizes the communication of control signals and data signals with the display apparatus 200 under the control of the controller 110. For example, the received user input signal is sent to the display apparatus 200. The communication interface 130 may include at least one of a WiFi chip 131, a Bluetooth module 132, an NFC module 133, or other near field communication modules.

As for the user input/output interface 140, an input interface includes at least one of a microphone 141, a touch pad 142, a sensor 143, a key 144, or the like, and an output interface includes an interface configured to send the received user instruction to the display apparatus 200. In some embodiments, the user input/output interface 140 may be an infrared interface or a radio frequency interface. In some embodiments, the control device 100 includes at least one of the communication interface 130 or the input/output interface 140. The control device 100 is provided with the communication interface 130, such as WiFi, Bluetooth, and NFC, and may encode the user input instruction through a WiFi protocol, or a Bluetooth protocol, or an NFC protocol, and send the user input instruction to the display apparatus 200.

The memory 190 is configured to store various operating programs, data, and applications configured to drive and control the display apparatus 200 under the control of the controller. The memory 190 may store various control signal instructions input from the user.

The power supply 180 is configured to provide operating power support for each element of the control device 100 under the control of the controller, and may be a battery and a related control circuit.

Figure 4:
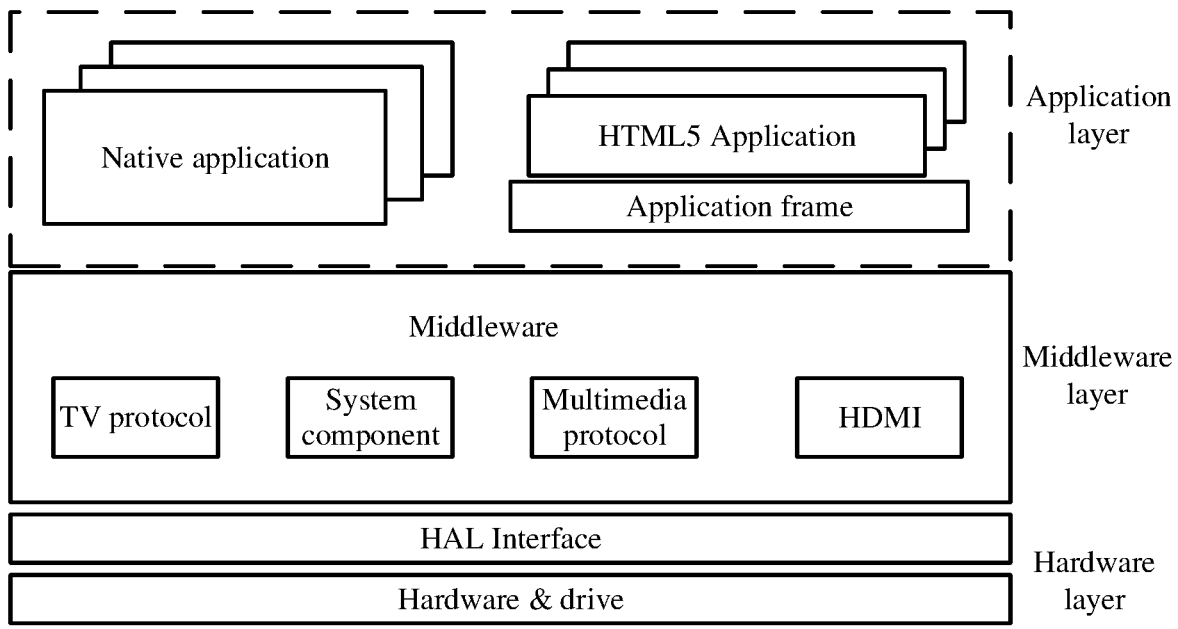
FIG. 4 is a schematic diagram of software configuration in a display apparatus 200.

As shown in FIG. 4, a system of the display apparatus is divided into three layers, namely an application layer, a middleware layer and a hardware layer from top to bottom.

Figure 5:
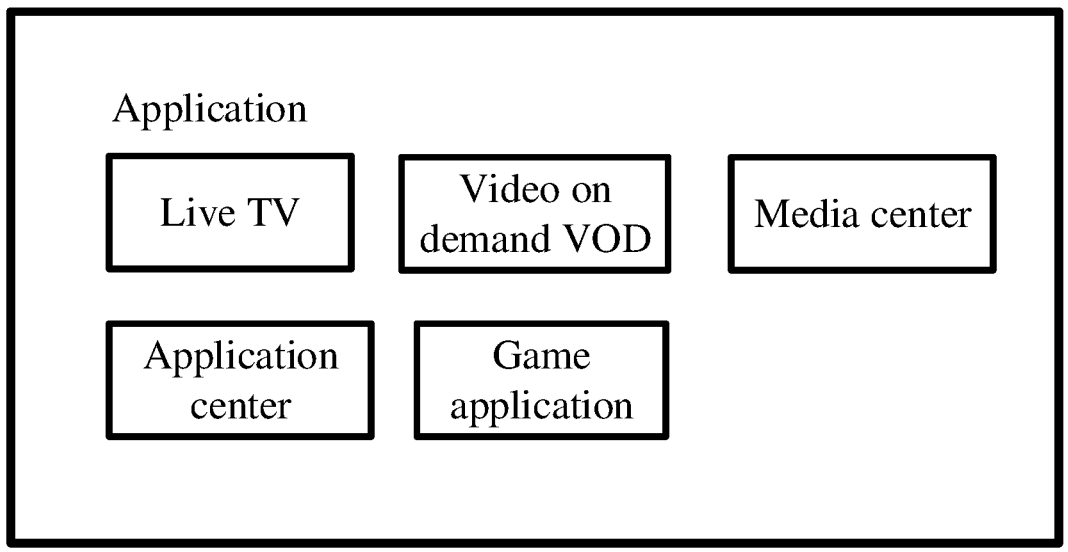
FIG. 5 is a schematic diagram of display of an icon control interface of applications in a display apparatus 200.

In some embodiments, as shown in FIG. 5, the application layer contains at least one application, and a corresponding icon control may be displayed on the display 275, such as: a live TV application icon control, a video-on-demand application icon control, a media center application icon control, an application center icon control, and a game application icon control, etc.

First Aspect.

The display apparatus may receive audio and video signals transmitted by dozens of channels, and each audio and video signal corresponds to a channel number. When the user switches channels through the remote control, the user needs to know the channel number corresponding to each audio and video signal in order to accurately control the display to play an audio and video signal that the user wants to play. Users often don't know a specific channel number, and need to call up the channel list first to query a channel number corresponding to the audio and video signal that the user wants to play, which wastes time and has poor user experience.

Figure 6:
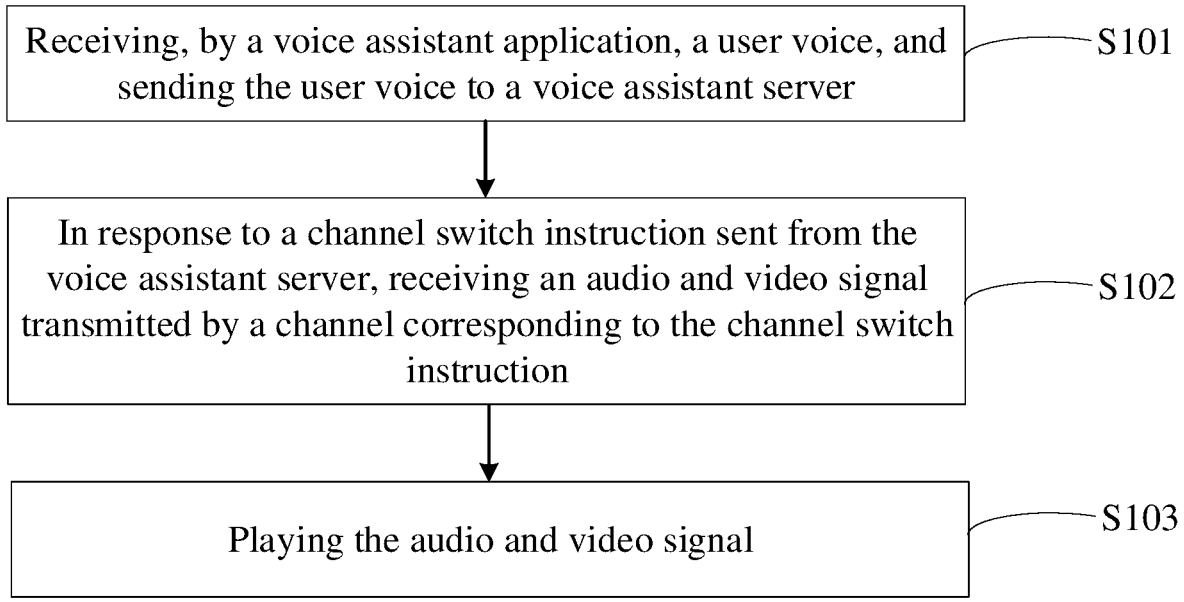
FIG. 6 is an operation flowchart of a display apparatus according to some embodiments.

In consideration of the above-mentioned problems, an embodiment of the present disclosure provides a display apparatus. The display apparatus includes a display, a user interface, and a controller. An operation flowchart of the display apparatus may refer to FIG. 6. The controller is configured to perform the following steps.

S101, a user voice is received by a voice assistant application, and sent to a voice assistant server.

The controller receives the user voice through the user interface, and the user voice involved in this embodiment of the present disclosure is a voice configured to instruct the display apparatus to switch channels. The user voice may include a channel name or a channel number. For example, in some feasible embodiments, a sending process of the user voice may be: a user outputs a wake-up word in advance, and then outputs the user voice. Based on the wake-up word, the user establishes a connection with the controller so that the controller can respond to the user voice output by the user correspondingly. For example, the user inputs a wake-up word "Xiaoju Tongxue" and a user voice "switch to A TV." In some feasible embodiments, for another example, the user inputs a wake-up word "Xiaoju Tongxue" and a user voice "switch to channel 57". This embodiment only exemplarily provides two forms of the user voice, and the user voice may be, but not limited to, the above two forms during actual application.

In the actual application process, each voice assistant corresponds to a voice assistant identifier, and the voice assistants send the voice assistant identifiers to the voice assistant server while sending the user voice. The voice assistant identifiers correspond to the voice assistants one to one, and each voice assistant identifier may be, but is not limited to, a user account, a voice assistant ID, and the like.

In the present disclosure, the voice assistant server is configured with a plurality of communication interfaces, and each communication interface is bound with a voice assistant identifier. When the voice assistant server receives one voice assistant identifier, the voice assistant server may call the communication interface corresponding to the voice assistant identifier to establish a connection with the corresponding voice assistant, and send a parsed channel switch instruction to the corresponding voice assistant.

The process of parsing, by the voice assistant server, the user voice will be described below with reference to specific examples.

In some embodiments, the user voice input from the user is a channel number "10", and the user voice is "switch to channel 10". The voice assistant outputs the user voice and the voice assistant identifier to the voice assistant server. The voice assistant server parses the user voice into a channel switch instruction.

The parsing process is:

{"inputs":[{"context":{"locale_country":"AU","locale_language":"en"},"intent":"action.devices.EXECUTE","payload":{"commands":[{"devices":[{"id":"8610030090000060000006418a7be72 6ebffe6d7b20884d409acb98d"}],"execution":[{"command":"action.devices.commands.selectCh annel","params":{"channelNumber":"10"}}]}]}}],"requestId":"13593393700909919799"}.

A parsing instruction is: channelNumber:"10". The voice assistant identifier is: Id: "13593393700909919799". The voice assistant server may call the communication interface corresponding to the voice assistant identifier to establish a connection with the corresponding voice assistant, and send the parsed channel switch instruction to the corresponding voice assistant.

In some embodiments, the user voice input from the user is a channel name "ABC", and the user voice is "switch to channel ABC". The voice assistant outputs the user voice and the voice assistant identifier to the voice assistant server. The voice assistant server parses the user voice into a channel switch instruction.

The parsing process is:

{"inputs":[{"context":{"locale_country":"AU","locale_language":"en"},"intent":"action.devices.EXECUTE","payload":{"commands":[{"devices":[{"id":"861003009000006000006418a7be726ebffe6d7b20884d409acb98d"}],"execution":[{"command":"action.devices.commands.selectChannel","params":{"channelCode":" ABC ","channelName":" ABC "}}]}]}}],"requestId":"728373555060824393"}.

A parsing instruction is: channelCode:"ABC". The voice assistant identifier is: Id: "728373555060824393". The voice assistant server may call the communication interface corresponding to the voice assistant identifier to establish a connection with the corresponding voice assistant, and send the parsed channel switch instruction to the corresponding voice assistant.

S102, in response to the channel switch instruction sent from the voice assistant server according to the user voice, an audio and video signal transmitted by a channel corresponding to the channel switch instruction is received.

There are many implementation methods to receive the audio and video signal transmitted by the channel corresponding to the channel switch instruction.

For example, each channel may be configured with a channel identifier, and in response to the channel switch instruction sent from the voice assistant server, the controller directly calls a channel with an identifier value matching the channel switch instruction, and receives an audio and video signal transmitted by the channel Each channel identifier may be a channel name or a channel number.

For example, in some embodiments, the display apparatus may receive audio and video signals transmitted by 100 channels, the channel identifiers corresponding to the channels are 1, 2, 3 . . . 100 respectively, and in response to the channel switch instruction channelNumber:"10" sent from the voice assistant server, the controller directly calls a channel corresponding to "10" and uses the channel to receive an audio and video signal. In some embodiments, the display apparatus may receive the audio and video signals transmitted by the 100 channels, the channel identifiers corresponding to the channels are: Name 1, Name 2, Name 3 . . . Name 100 respectively, and in response to the channel switch instruction channelCode:"Name 1" sent from the voice assistant server, the controller directly calls a channel corresponding to "Name 1" and uses the channel to receive an audio and video signal.

Figure 7:
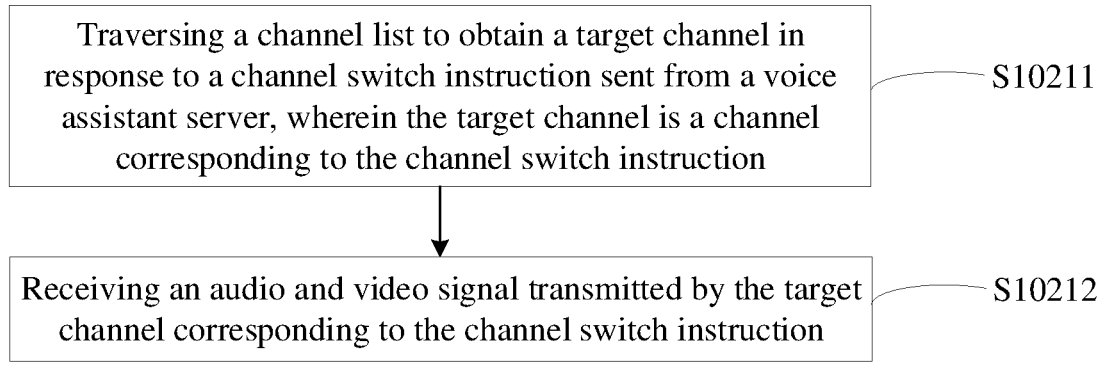
FIG. 7 is a flowchart of a process of receiving an audio and video signal transmitted by a channel corresponding to a channel switch instruction according to some embodiments.

For another example, the controller is configured to store a channel list, and the channel list is configured to record correspondence relations among channel names, channel numbers, and channels. One implementation method of receiving the audio and video signal transmitted by the channel corresponding to the channel switch instruction may refer to FIG. 7. The controller is further configured to: S10211, traverse the channel list to obtain a target channel in response to the channel switch instruction sent from the voice assistant server according to the user voice, wherein the target channel is a channel corresponding to the channel switch instruction.

In some embodiments, the controller may receive signals transmitted by 60 channels, and a channel list may refer to Table 1.

TABLE 1

| No. | Channel Name | Channel Number | Channel(s) |
|-----|--------------|----------------|------------|
| 1   | Name A       | 1              | channel 1  |
| 2   | Name B       | 2              | channel 2  |
| 3   | Name C       | 3              | channel 3  |
| 4   | Name D       | 4              | channel 4  |
| ... | ...          | ...            | ...        |
| 60  | Name N       | 60             | channel 60 |

In response to the channel switch instruction sent from the voice assistant server, the controller traverses the channel list in the order of the serial number to obtain a target channel, and the target channel is a channel corresponding to the channel switch instruction. For example, in response to the channel switch instruction channelNumber:"4" sent from the voice assistant server, the controller traverses Table 1, and when finding the channel number 4, determines a channel 4 corresponding to the channel number 4 as the target channel. The controller calls the channel 4, and uses the channel 4 to receive an audio and video signal.

In order to improve the traversal efficiency of the controller to a certain extent, in some embodiments, the controller may configure a channel list according to historical data. Specifically, the controller may count how many times each channel has been called, and write the corresponding channel numbers, channel names, and channels into the channel list in sequence in terms of the times. For example, the controller counts how each channel of the display apparatus has been called in the last month. The channels are: a channel A, a channel B, a channel C, a channel D, a channel E, . . . , in a descending order in terms of the times a channel has been called, and a finally generated channel list may refer to Table 2.

TABLE 2

| No. | Channel Name | Channel Number | Channel(s) |
|-----|--------------|----------------|------------|
| 1   | A TV         | 12             | channel A  |

TABLE 2-continued

| No. | Channel Name | Channel Number | Channel(s) |
|---|---|---|---|
| 2 | B TV | 25 | channel B |
| 3 | C TV | 6 | channel C |
| 4 | D TV | 57 | channel D |
| 4 | E TV | 24 | channel E |
| ... | ... | ... | ... |
| 60 | Name N | 60 | channel 60 |

With the channel list shown in this embodiment, the traversal efficiency of the controller may be improved in some cases. For example, the user prefers programs of A TV, and switches channels 5 times in 10 o'clock-12 o'clock, which are: the channel A, the channel B, the channel A, the channel C, and the channel A respectively. When the user switches channels for the first, third and fifth times, the controller may determine a target channel by traversing one data in Table 2, thereby increasing the traversal speed of the controller.

In some embodiments, each channel name includes: a full name of a channel, a short name of the channel, and a like name of the channel The like name may be configured according to a user's habit. For example: a like name of A Broadcasting and TV Station may be "Mangguo TV". B Radio and TV Group Satellite TV Channel may be called "Lanmei TV", and a satellite channel of C Broadcasting Station (Group) may be called "Lizhi TV". Table 3 is a channel list according to some embodiments.

TABLE 3

| No. | Channel Name | Channel Number | Channel(s) |
|---|---|---|---|
| 1 | A Broadcasting and TV Station, A Satellite TV, A TV, Mangguo TV | 12 | channel A |
| 2 | B Radio and TV Group Satellite TV Channel, B Satellite TV, Lanmei TV | 25 | channel B |
| 3 | a satellite channel of C Broadcasting Station (Group), C TV, Lizhi TV | 6 | channel C |
| 4 | DRAGON TV of D Broadcasting and TV Station, D TV, Fanqie TV | 14 | channel D |
| ... | ... | ... | ... |
| 60 | Name N | 60 | channel 60 |

The schemes shown in the embodiment of the present disclosure may reduce the user voices input from the user and improve the user experience. For example, in some embodiments, the user wants to switch to "A Broadcasting and TV Station", and the user voice input from the user may be "Mangguo TV". The voice assistant server parses the user voice to obtain a switch instruction channelCode:"Mangguo TV". In response to the channel switch instruction channelCode:"Mangguo TV" sent from the voice assistant server, the controller traverses Table 3 to obtain a target channel, namely the channel A. The controller uses the channel A to receive audio and video data.

In some embodiments, the voice assistant server may store a channel name list. The channel name list is configured to store a correspondence relation between the switch instruction and channel names Each channel name may include: a full name of a channel, a short name of the channel, and a like name of the channel. Table 4 is a channel name list according to some embodiments.

TABLE 4

| No. | Channel Name | ChannelSwitch Instruction (a full name of a channel) |
|---|---|---|
| 1 | A Broadcasting and TV Station, A Satellite TV, A TV, Mangguo TV | A Broadcasting and TV Station |
| 2 | B Radio and TV Group Satellite TV Channel, B Satellite T, Lanmei TV | B Radio and TV Group Satellite TV Channel |
| 3 | a satellite channel of C Broadcasting Station (Group), C TV, Lizhi TV | a satellite channel of C Broadcasting Station (Group) |
| 4 | DRAGON TV of D Broadcasting and TV Station, D TV, Fanqie TV | DRAGON TV of D Broadcasting and TV Station |
| ... | ... | ... |
| 60 | Name N | Name N |

In this embodiment, the channel list stored by the controller only records correspondence relations among the full names of the channels, the channel numbers, and the channels. Table 5 is a channel list of this embodiment.

TABLE 5

| No. | Channel Name | Channel Number | Channel(s) |
|---|---|---|---|
| 1 | A Broadcasting and TV Station, A Satellite TV | 12 | channel A |
| 2 | B Radio and TV Group Satellite TV Channel | 25 | channel B |
| 3 | a satellite channel of C Broadcasting Station (Group) | 6 | channel C |
| 4 | DRAGON TV of D Broadcasting and TV Station | 14 | channel D |
| ... | ... | ... | ... |
| 60 | Name N | 60 | Channel 60 |

In order to reduce the data storage capacity of the voice assistant server and the controller, a short name may be used as a channel switch instruction in a feasible example.

For example, in some embodiments, if the user wants to switch to the "Mangguo TV", the user voice input from the user may be "Mangguo TV". The channel name list stored by the voice assistant server may refer to Table 4. The voice assistant server parses the user voice to obtain a switch instruction channelCode:"A Broadcasting and TV Station". In response to the channel switch instruction channelCode: "A Broadcasting and TV Station" sent from the voice assistant server, the controller traverses Table 5 to obtain a target channel, namely the channel A. The controller uses the channel A to receive audio and video data.

In order to reduce the data processing capacity of the controller, in some embodiments, the channel list includes a first sublist and a second sublist. The first sublist is configured to record a correspondence relation between the channel numbers and the channels, and the second sublist is configured to record a correspondence relation between the channel names and the channels. The channel switch instruction further includes a channel identifier. The controller is further configured to: traverse the first sublist in response to that the channel switch instruction sent from the voice assistant server includes a first identifier; and traverse the second sublist in response to that the channel switch instruction sent from the voice assistant server includes a second identifier.

Table 6 is the second sublist according to some embodiments, and Table 7 is the first sublist according to some embodiments.

TABLE 6

| No. | Channel Name | Channel(s) |
|---|---|---|
| 1 | A Broadcasting and TV Station, A Satellite TV, A TV, Mangguo TV | channel A |
| 2 | B Radio and TV Group Satellite TV Channel, B Satellite TV Channel, B Satellite T, Lanmei TV | channel B |
| 3 | a satellite channel of C Broadcasting Station (Group), C TV, Lizhi TV | channel C |
| 4 | DRAGON TV of D Broadcasting and TV Station, D TV, Fanqie TV | channel D |
| ... | ... | ... |
| 60 | Name N | channel 60 |

TABLE 7

| No. | Channel Number | Channel(s) |
|---|---|---|
| 1 | 12 | channel A |
| 2 | 25 | channel B |
| 3 | 6 | channel C |
| 4 | 14 | channel D |
| ... | ... | ... |
| 60 | 60 | channel 60 |

For example, in some embodiments, the channel switch instruction received by the controller is channelcode:"A Satellite TV", and the controller recognizes a channel identifier channelcode as a first identifier. The controller traverses the first sublist based on "A Satellite TV", and determines that the channel A is the target channel. In some embodiments, the channel switch instruction received by the controller is channelNumber: "4", and the controller recognizes a channel identifier channelNumber as a second identifier. The controller traverses the first sublist based on "4" and determines that channel A is the target channel.

S10212, an audio and video signal transmitted by the target channel corresponding to the channel switch instruction is received.

An implementation method of receiving the audio and video signal transmitted by the target channel may adopt a signal receiving method commonly used in the art, which will not be repeated here by the applicant.

Figure 8:
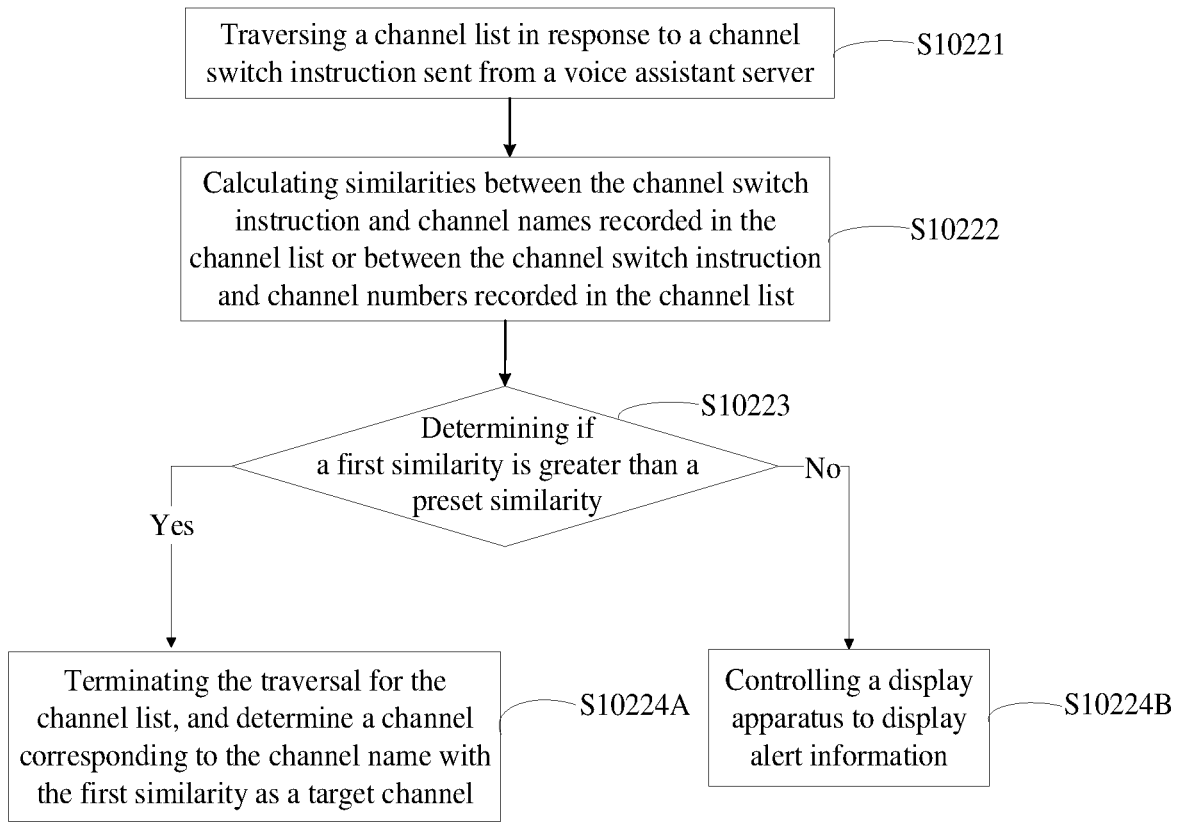
FIG. 8 is a flowchart of a process of receiving an audio and video signal transmitted by a channel corresponding to a channel switch instruction according to some embodiments.

For another example, the controller stores the channel list, and the channel list is configured to record the correspondence relations among the channel names, the channel numbers, and the channels. The implementation method of receiving the audio and video signal transmitted by the channel corresponding to the channel switch instruction may refer to FIG. 8. The controller is further configured to perform the following.

S10221, traverse the channel list in response to the channel switch instruction sent from the voice assistant server.

S10222, calculate similarities between the channel switch instruction and the channel names recorded in the channel list or between the channel switch instruction and the channel numbers recorded in the channel list, wherein a calculation method of the similarities may adopt a similarity calculation method commonly used in the art, which will not be limited too much here by the applicant.

S10223, determine whether a first similarity is greater than a preset similarity.

The preset similarity may be set according to requirements, for example, in some embodiments, the preset similarity may be 72%.

If the first similarity is greater than the preset similarity, S10224A is executed, that is, the traversal for the channel list is terminated, and a channel corresponding to the channel name or the channel number with the first similarity is determined as a target channel.

If no channel name or channel number with a similarity greater than the preset similarity is found, S10224B is executed, that is, the display apparatus is controlled to display alert information. The alert information is configured to indicate that no channel matched with the user voice is found for the user.

For example, in some embodiments, the user voice input from the user is "A". The voice assistant server parses the user voice into a channel switch instruction channelcode: "A", and sends the channel switch instruction. In response to receiving the channel switch instruction channelcode:"A", the controller traverses the channel list Table 6 and figures out that a similarity between "A" and "A Broadcasting and TV Station" is 85% (greater than the preset similarity), the controller calls the channel A to receive an audio and video signal, and at the same time, the controller terminates the traversal for Table 6.

In some embodiments, the user voice input from the user is "A". The voice assistant server parses the user voice into a channel switch instruction channelcode:"Lanmei TV", and sends the channel switch instruction. In response to receiving the channel switch instruction channelcode:"Lanmei TV", the controller traverses the channel list Table 6 and figures out that similarities between "Lanmei TV" and "A Broadcasting and TV Station", "A Satellite TV", "A TV", and "Mangguo TV" are all 0% (less than the preset similarity). The controller continues to figure out that a similarity between "Lanmei TV" and "Lanmei TV" is 100% (greater than the preset similarity), the controller calls Zhejiang Channel to receive an audio and video signal, and at the same time, the controller terminates the traversal for Table 6.

In some embodiments, the user voice input from the user is "101". The voice assistant server parses the user voice into a channel switch instruction channelNumber:"101", and sends the channel switch instruction. In response to receiving the channel switch instruction channelNumber:"101", the controller traverses the channel list Table 6 and figures out that a similarity between "101" and each channel number is 0% (less than the preset similarity). The controller continues to figure out that a similarity between "Lanmei TV" and "Lanmei TV" is 100% (greater than the preset similarity), the display apparatus is controlled to display the alert information, wherein the alert information is configured to indicate that no channel matched with the user voice is found for the user. The alert information may be displayed in the form of a floating layer window.

S103, the audio and video signal is played.

A play mode of the audio and video signal may adopt a play mode commonly used in the art, which will not be repeated here by the applicant.

Figure 9:
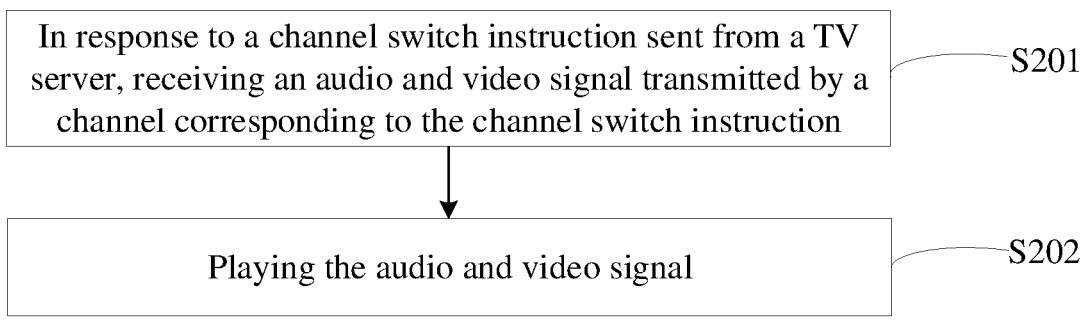
FIG. 9 is an operation flowchart of a display apparatus according to some embodiments.

In consideration of the above-mentioned problems, an embodiment of the present disclosure provides a display apparatus. The display apparatus includes a display, a user interface, and a controller. The operation flowchart of the display apparatus may refer to FIG. 9. The controller is configured to perform the following steps.

S201, in response to a channel switch instruction sent from a TV server, an audio and video signal transmitted by a channel corresponding to the channel switch instruction is received.

The specific implementation process is: the display apparatus is pre-bound with a soundbox, wherein the soundbox is configured to receive a user voice; and in response to receiving the user voice, the soundbox outputs the user voice and an apparatus identifier of the display apparatus bound with the soundbox to a voice assistant server. The apparatus identifier may be, but is not limited to, an apparatus ID.

The voice assistant server is configured to parse the user voice into the channel switch instruction, and output the channel switch instruction and the apparatus ID to the TV server. The parsing process of the user voice may refer to the above-mentioned embodiment, which will not be repeated here.

The TV server receives the channel switch instruction and the apparatus ID, calls a transmission channel which is a channel corresponding to the apparatus ID, and transmits, by the transmission channel, the channel switch instruction. In the present disclosure, the TV server is configured with a plurality of communication interfaces, and each communication interface is bound with one apparatus identifier. When the TV server receives one apparatus identifier, the TV server may call a communication interface corresponding to the apparatus identifier to establish a connection with a corresponding display apparatus, and send the channel switch instruction to the corresponding display apparatus.

In response to the channel switch instruction sent from the TV server, an implementation method of receiving the audio and video signal transmitted by the channel corresponding to the channel switch instruction may refer to the above-mentioned embodiment, which will not be repeated here by the applicant.

S202, the audio and video signal is played.

A play mode of the audio and video signal may adopt a play mode commonly used in the art, which will not be repeated here by the applicant.

In some embodiments, the user voice includes a channel name or a channel number. The controller is configured to store a channel list, and the channel list is configured to record correspondence relations among channel names, channel numbers and channels. The controller is further configured to: traverse the channel list to obtain a target channel in response to the channel switch instruction sent from the TV server, wherein the target channel is a channel corresponding to the channel switch instruction; and receive an audio and video signal transmitted by the target channel corresponding to the channel switch instruction.

In some embodiments, the channel list includes a first sublist and a second sublist. The first sublist is configured to record a correspondence relation between the channel numbers and the channels. The second sublist is configured to record a correspondence relation between the channel names and the channels. The channel switch instruction further includes a channel identifier. The controller is further configured to: traverse the first sublist in response to that the channel switch instruction sent from the TV server includes a first identifier; and traverse the second sublist in response to that the channel switch instruction sent from the TV server includes a second identifier.

In some embodiments, the controller is further configured to: traverse the channel list in response to the channel switch instruction sent from the TV server; calculate similarities between the channel switch instruction and the channel names recorded in the channel list or between the channel switch instruction and the channel numbers recorded in the channel list; and if a first similarity is greater than a preset similarity, terminate the traversal for the channel list, and determine a channel corresponding to the channel name or the channel number with the first similarity as the target channel.

In some embodiments, the controller is further configured to: control the display apparatus to display alert information if no channel name or channel number with a similarity greater than the preset similarity is found. The alert information is configured to indicate that no channel matched with the user voice is found for a user.

In some embodiments, each channel name in the channel list includes: a full name of a channel, a short name of the channel, and a like name of the channel.

Figure 10:
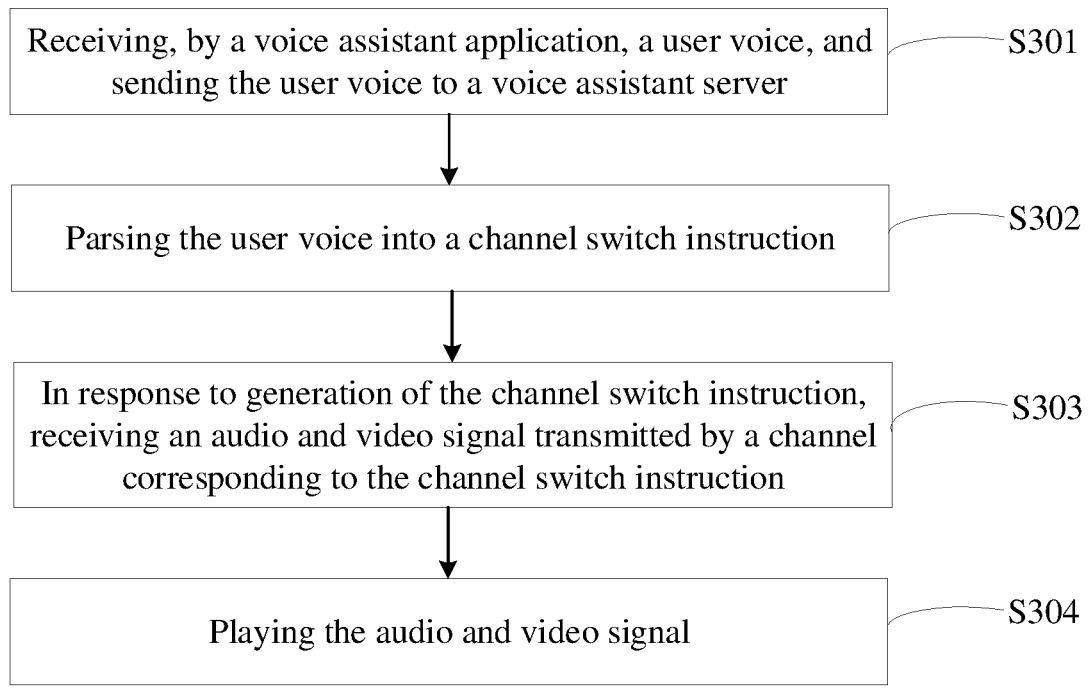
FIG. 10 is an operation flowchart of a display apparatus according to some embodiments.

An embodiment of the present disclosure provides a display apparatus. The display apparatus includes a display, a user interface, and a controller. The operation flowchart of the display apparatus may refer to FIG. 10. The controller is provided with a voice assistant application, and is configured to perform the following steps.

S301, a user voice is received by the voice assistant application.

An implementation method of receiving the user voice may adopt a commonly used voice receiving method in the art, which is not limited too much here by the applicant.

S302, the user voice is parsed into a channel switch instruction.

The parsing process of the user voice may refer to the above-mentioned embodiment, which will not be repeated here.

S303, in response to generation of the channel switch instruction, an audio and video signal transmitted by a channel corresponding to the channel switch instruction is received.

An implementation method of receiving the audio and video signal transmitted by the channel corresponding to the channel switch instruction may refer to the above-mentioned embodiment, which will not be repeated here by the applicant.

S304, the audio and video signal is played.

A play mode of the audio and video signal may adopt a play mode commonly used in the art, which will not be repeated here by the applicant.

In some embodiments, the user voice includes a channel name or a channel number. The controller is configured to store a channel list, and the channel list is configured to record correspondence relations among channel names, channel numbers and channels. The controller is further configured to: traverse the channel list to obtain a target channel in response to generation of the channel switch instruction, wherein the target channel is a channel corresponding to the channel switch instruction; and receive an audio and video signal transmitted by the target channel corresponding to the channel switch instruction.

In some embodiments, the channel list includes a first sublist and a second sublist. The first sublist is configured to record a correspondence relation between the channel numbers and the channels. The second sublist is configured to record a correspondence relation between the channel names and the channels. The channel switch instruction further includes a channel identifier. The controller is further configured to: traverse the first sublist in response to that the channel switch instruction includes a first identifier; and traverse the second sublist in response to that the channel switch instruction includes a second identifier.

In some embodiments, the controller is further configured to: in response to generation of the channel switch instruction, traverse the channel list; calculate similarities between the channel switch instruction and the channel names recorded in the channel list or between the channel switch instruction and the channel numbers recorded in the channel list; and if a first similarity is greater than a preset similarity, terminate the traversal for the channel list, and determine a channel corresponding to the channel name or the channel number with the first similarity as the target channel.

In some embodiments, the controller is further configured to: control the display apparatus to display alert information if no channel name or channel number with a similarity greater than the preset similarity is found. The alert information is configured to indicate that no channel matched with the user voice is found for a user.

In some embodiments, each channel name in the channel list includes: a full name of a channel, a short name of the channel, and a like name of the channel.

Figure 11:
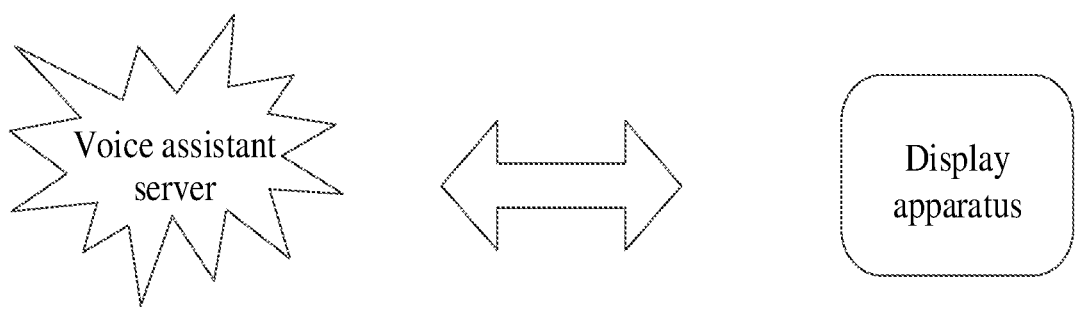
FIG. 11 is a schematic diagram of a display system according to some embodiments.
Figure 12:
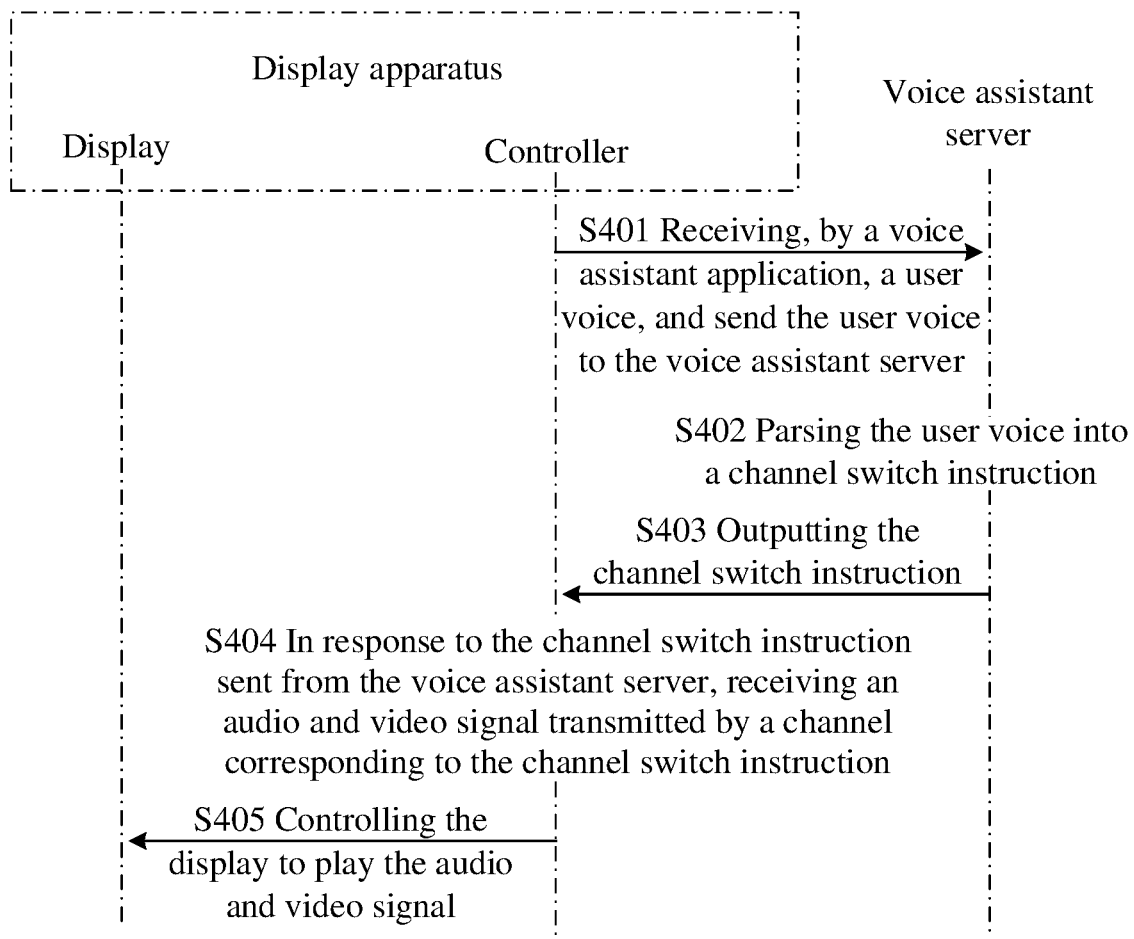
FIG. 12 is an interaction diagram of devices of a display system according to some embodiments.

An embodiment of the present disclosure provides a display system which may specifically refer to FIG. 11 and FIG. 12. FIG. 11 is a schematic diagram of the display system according to some embodiments, from which it can be seen that the display system includes: a voice assistant server and a display apparatus. FIG. 12 is an interaction diagram of devices of the display system according to some embodiments. From FIG. 12, it can be seen by following.

A controller of the display apparatus is provided with a voice assistant application, and the controller executes step S401, that is, a user voice is received by the voice assistant application, and sent to the voice assistant server.

The voice assistant server executes step S402, that is, the user voice is parsed into a channel switch instruction, and the channel switch instruction is output.

The voice assistant server executes step S403, that is, the channel switch instruction is output.

The controller executes step S404, that is, an audio and video signal transmitted by a channel corresponding to the channel switch instruction is received in response to the channel switch instruction sent from the voice assistant server.

The controller executes step S405, that is, a display is controlled to play the audio and video signal.

In some embodiments, the user voice includes a channel name or a channel number. The controller is configured to store a channel list, and the channel list is configured to record correspondence relations among channel names, channel numbers and channels.

The display apparatus is further configured to: traverse the channel list to obtain a target channel in response to the channel switch instruction sent from the voice assistant server, wherein the target channel is a channel corresponding to the channel switch instruction; and receive an audio and video signal transmitted by the target channel corresponding to the channel switch instruction.

In some embodiments, the user voice includes a channel name or a channel number. The controller is configured to store the channel list, and the channel list is configured to record the correspondence relations among the channel names, the channel numbers and the channels.

The display apparatus is further configured to: traverse the channel list to obtain the target channel in response to the channel switch instruction sent from the voice assistant server, wherein the target channel is a channel corresponding to the channel switch instruction; and receive the audio and video signal transmitted by the target channel corresponding to the channel switch instruction.

In some embodiments, the display apparatus is further configured to: traverse the channel list in response to the channel switch instruction sent from the voice assistant server; calculate similarities between the channel switch instruction and the channel names recorded in the channel list or between the channel switch instruction and the channel numbers recorded in the channel list; and if a first similarity is greater than a preset similarity, terminate the traversal for the channel list, and determine a channel corresponding to the channel name or the channel number with the first similarity as the target channel.

In some embodiments, the channel list includes a first sublist and a second sublist. The first sublist is configured to record a correspondence relation between the channel numbers and the channels. The second sublist is configured to record a correspondence relation between the channel names and the channels. The channel switch instruction further includes a channel identifier.

The first sublist is traversed in response to that the channel switch instruction sent from the voice assistant server includes a first identifier; and the second sublist is traversed in response to that the channel switch instruction sent from the voice assistant server includes a second identifier.

In some embodiments, each channel name in the channel list includes: a full name of a channel, a short name of the channel, and a like name of the channel.

Figure 13:
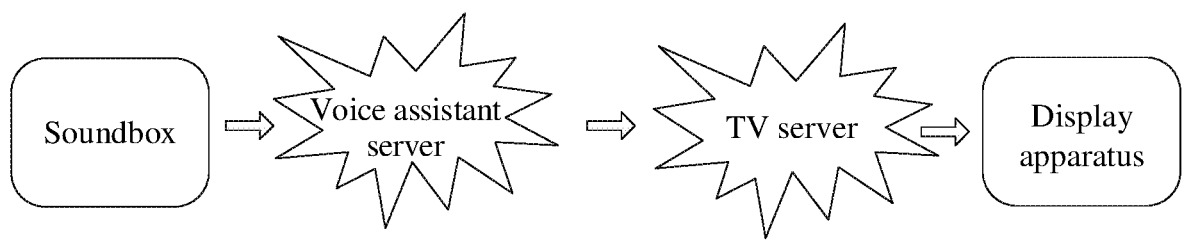
FIG. 13 is a schematic diagram of a display system according to some embodiments.

An embodiment of the present disclosure provides a display system which may specifically refer to FIG. 13 and FIG. 14. FIG. 13 is a schematic diagram of the display system according to some embodiments, from which it can be seen that the display system includes: a voice assistant server, a TV server, a soundbox, and a display apparatus. FIG. 14 is an interaction diagram of devices of the display system according to some embodiments. From FIG. 14, it can be seen by following.

The soundbox executes step S501, that is, a user voice and an apparatus ID are received, and sent to the voice assistant server.

The voice assistant server executes step S502, that is, the user voice is parsed into a channel switch instruction.

The voice assistant server executes step S503, that is, the channel switch instruction and the apparatus ID are output.

The TV server executes step S504, that is, the channel switch instruction and the apparatus ID are received, and a transmission channel is called. The transmission channel is a channel corresponding to the apparatus ID.

The TV server executes step S505, that is, the channel switch instruction is transmitted by the transmission channel.

The display apparatus executes step S506, that is, in response to the channel switch instruction sent from the TV server, an audio and video signal transmitted by a channel corresponding to the channel switch instruction is received.

The display apparatus executes step S507, that is, the audio and video signal is played.

In some embodiments, the user voice includes a channel name or a channel number. The controller is configured to store a channel list, and the channel list is configured to record correspondence relations among channel names, channel numbers and channels. The controller is further configured to: traverse the channel list to obtain a target channel in response to the channel switch instruction sent from the TV server, wherein the target channel is a channel corresponding to the channel switch instruction; and receive an audio and video signal transmitted by the target channel corresponding to the channel switch instruction.

In some embodiments, the channel list includes a first sublist and a second sublist. The first sublist is configured to record a correspondence relation between the channel numbers and the channels. The second sublist is configured to record a correspondence relation between the channel names and the channels. The channel switch instruction further includes a channel identifier. The controller is further configured to: traverse the first sublist in response to that the channel switch instruction sent from the TV server includes a first identifier; and traverse the second sublist in response to that the channel switch instruction sent from the TV server includes a second identifier.

In some embodiments, the controller is further configured to: traverse the channel list in response to the channel switch instruction sent from the TV server; calculate similarities between the channel switch instruction and the channel names recorded in the channel list or between the channel switch instruction and the channel numbers recorded in the channel list; and if a first similarity is greater than a preset similarity, terminate the traversal for the channel list, and determine a channel corresponding to the channel name or the channel number with the first similarity as the target channel.

In some embodiments, the controller is further configured to: control the display apparatus to display alert information if no channel name or channel number with a similarity greater than the preset similarity is found. The alert information is configured to indicate that no channel matched with the user voice is found for a user.

In some embodiments, each channel name in the channel list includes: a full name of a channel, a short name of the channel, and a like name of the channel.

Second Aspect.

Some display apparatuses are provided with voice assistant APPs which may convert input user voices into control instructions. Each voice assistant APP can recognize a limited quantity of voices, and in order to increase the quantity of recognized voices, some display apparatuses are provided with a plurality of voice assistant APPs. Generally, each voice assistant has an independent operation interface. When switching between different voice assistants, a user needs to skip between the operation interfaces of the different voice assistants, and the user experience is poor.

The second aspect of the embodiment of the present disclosure shows a display apparatus. Components included in the display apparatus and the functions of each component may refer to the above-mentioned embodiments, and the operation flow of the display apparatus may refer to FIG. 15. FIG. 15 is an operation flowchart of the display apparatus according to some embodiments. A controller of the display apparatus is configured to perform the following steps.

S1501, in response to launch of a control application, a display interface is displayed on a display. The display interface is configured with at least one identifier control, and each identifier control is configured to load an identifier of an installed voice assistant.

In the schemes shown in the embodiment of the present disclosure, the display apparatus is provided with the control application, and the control application may be bound with accounts of a plurality of voice assistants at the same time. When the control application is launched, the display interface is displayed on the display, wherein the display interface is configured with at least one identifier control, and each identifier control is configured to load the identifier of the corresponding installed voice assistant.

For example: in some embodiments, the display apparatus is provided with four voice assistants: a voice assistant 1, a voice assistant 2, a voice assistant 3, and a voice assistant 4. When the control application is launched, the display interface is displayed on the display. The display interface may refer to FIG. 16. It can be seen from FIG. 16 that the display interface in this embodiment is provided with four identifier controls in total, and each identifier control is configured to display an identifier of a corresponding voice assistant. It is worth noting that this embodiment does not limit the identifiers, and the identifiers may be Chinese names of the voice assistants, or English abbreviations of the voice assistants, or icons of the voice assistants.

S1502, in response to a user's operation on one identifier control, the display is controlled to display a setting page of a voice assistant corresponding to the identifier control. If the voice assistant has been bound, the setting page is provided with a switch control so that a user can turn on or off the voice assistant based on the switch control disposed on the setting page.

Figure 17:
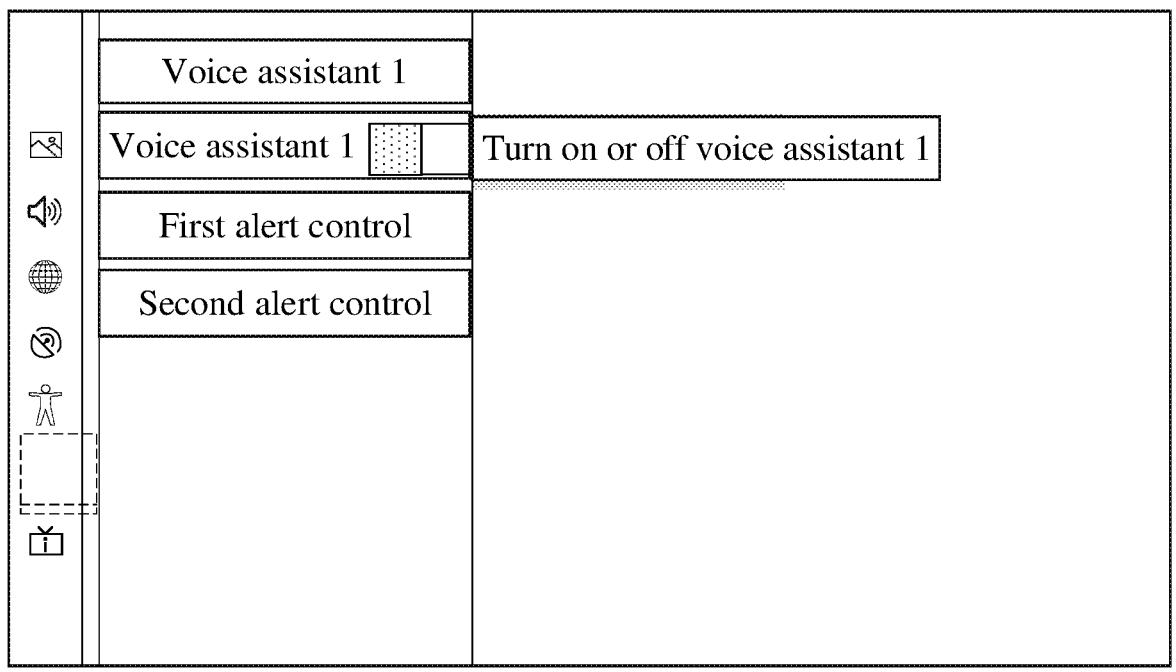
FIG. 17 is a schematic diagram of a setting interface according to some embodiments.

For example: in some embodiments, the voice assistant 1 is pre-bound with the control application, and when the user operates the identifier control corresponding to the voice assistant 1, the setting page is displayed on the display. The setting page may refer to FIG. 17. FIG. 17 is a schematic diagram of the setting page according to some embodiments. It can be seen from FIG. 17 that the setting page is provided with a switch control so that the user can operate the switch control to turn on or turn off the voice assistant 1.

In some feasible embodiments, the control application may be bound with a plurality of voice assistants at the same time, and the user only needs to touch the corresponding switch control on an application interface of the control application to realize the autonomous selection of a plurality of voice assistant functions, thereby improving the user experience of the voice functions and making up for the lack of functions of a single voice assistant.

For example: in some embodiments, the control application is bound with Google Voice Assistant and Amazon Voice Assistant at the same time. The user only needs to turn on or off the corresponding voice assistant on an operation interface of the control application according to own preferences to realize the autonomous switch of a plurality of intelligent voice assistants. The control process may include: do not turn on a control switch of Google Voice Assistant and a control switch of Amazon Voice Assistant, all intelligent voice functions are not available; turn on the control switch of Google Voice Assistant and turn off the control switch of Amazon Voice Assistant, the Google Voice function is available; turn off the control switch of Google Voice Assistant, and turn on the control switch of Amazon Voice Assistant, the Amazon voice function is available; and turn on the control switch of Google Voice Assistant and turn on the control switch of Amazon Voice Assistant, both the Google voice function and the Amazon voice function are available.

It can be seen from the above-mentioned scheme that this embodiment shows the display apparatus, the control application is disposed on the display apparatus, the control application may be bound with the plurality of voice assistants at the same time, when the control application is launched, the display may display the display interface, the display interface is provided with at least one identifier control, and each identifier control is configured to load an identifier of an installed voice assistant. In response to the user's operation on one identifier control, the display is controlled to display the setting page of the voice assistant corresponding to the control; and if the voice assistant has been bound, the setting page is provided with the switch control, so that the user can turn on or off the voice assistant by operating the switch control according to own preferences. With adoption of the display apparatus shown in the embodiment of the present disclosure, the user may realize the control over the bound voice assistants through the operation interface (including the display interface and the setting page) of the control application, in this process, there is no need to switch between operation interfaces of the plurality of voice assistants, and the user experience is better.

In some embodiments, the controller is further configured to: if one voice assistant is not bound, in response to the user's operation on one identifier control, control the display to display a binding interface of the voice assistant, so that the user can operate the corresponding control on the binding interface to realize binding of the voice assistant.

Figure 16:
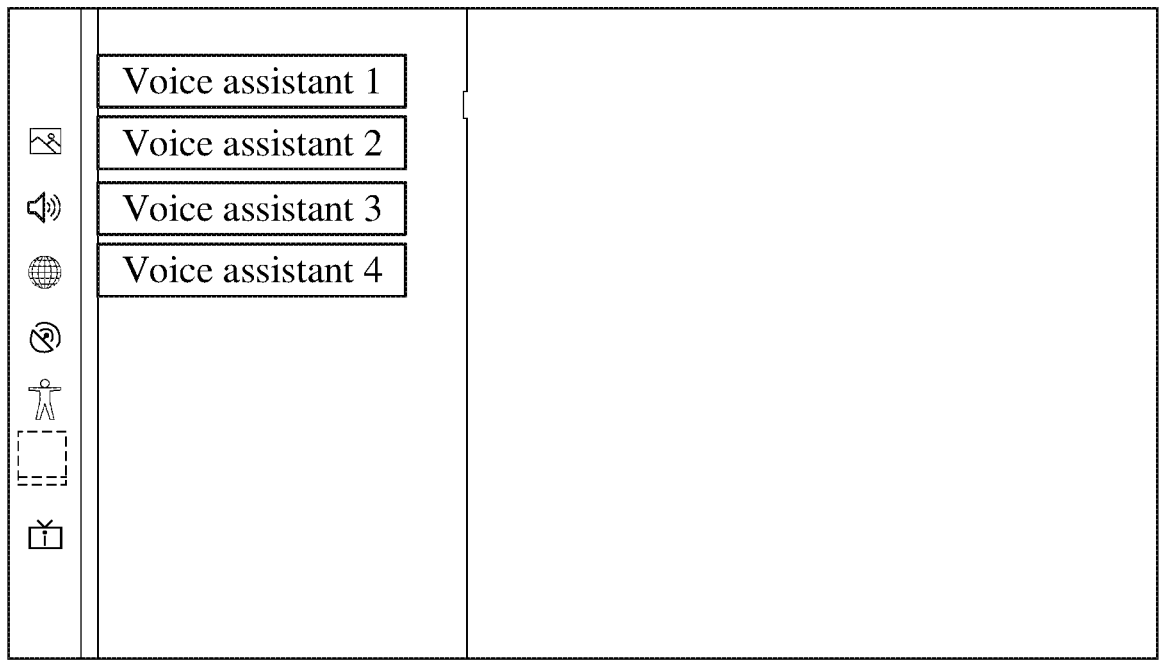
FIG. 16 is a schematic diagram of a display interface according to some embodiments.

For example, continuing to take the display interface shown in FIG. 16 as an example, it can be seen that the display apparatus is provided with four voice assistants: a voice assistant 1, a voice assistant 2, a voice assistant 3, and a voice assistant 4. The voice assistant 2 is not bound, and when the user touches the identifier control corresponding to the voice assistant 2, the binding interface is displayed on the display. The binding interface may refer to FIG. 18A. It can be seen from FIG. 18A that the binding interface is configured with a confirm control, and binding of the voice assistant and the control application may be realized in response to the user's operation on the confirm control.

In recent years, some users have installed a plurality of display apparatuses at home, and in order to further enhance the user experience, in the scheme shown in this embodiment, different voice assistants may be configured for different display apparatuses. Specifically, each voice assistant may be bound with different display apparatuses.

For example, continuing to take the display interface shown in FIG. 16 as an example, it can be seen that the display apparatus is provided with four voice assistants: the voice assistant 1, the voice assistant 2, the voice assistant 3, and the voice assistant 4, wherein the voice assistant 2 is not bound, when the user operates the identifier control corresponding to the voice assistant 2, a binding interface displayed on the display may refer to FIG. 18B, the binding interface is configured with a confirm control and selected controls, and each selected control may be configured to load the name of one display apparatus in the user's home. For example, in this embodiment, there are three display apparatuses installed in the user's home, and names of the three display apparatuses are respectively: a living room display apparatus, a master bedroom display apparatus and a guest bedroom display apparatus. Correspondingly, the binding interface is provided with 3 selected controls which are respectively configured to load: the living room display apparatus, the master bedroom display apparatus and the guest bedroom display apparatus. Specifically, the binding interface may refer to FIG. 18B. It is worth noting that the names of the display apparatuses cannot be reused. The user may bind the display apparatus and the voice assistant in the following way. For example, the user touches the selected control corresponding to the living room display apparatus, and then touchs the confirm control to complete binding of the voice assistant 2, and the voice assistant 2 may provide services for the living room display apparatus. For another example, the user respectively touchs the selected controls corresponding to the living room display apparatus and the master bedroom display apparatus, and then touchs the confirm control to complete binding of the voice assistant 2, and the voice assistant 2 may provide services for the living room display apparatus and the master bedroom display apparatus.

In some embodiments, the setting page is further provided with a first alert control. The controller is also configured to: if one voice assistant is not bound, in response to the user's operation on the first alert control, control the display to display a binding alert interface of the voice assistant, wherein the binding alert interface is configured to display alert information of a binding process of the voice assistant; and the binding alert interface is provided with a confirm control, and in response to the user' operation on the confirm control, control the display to display a binding interface of the voice assistant, so that the user can operate the corresponding control on the binding interface to realize binding of the voice assistant.

Figure 19:
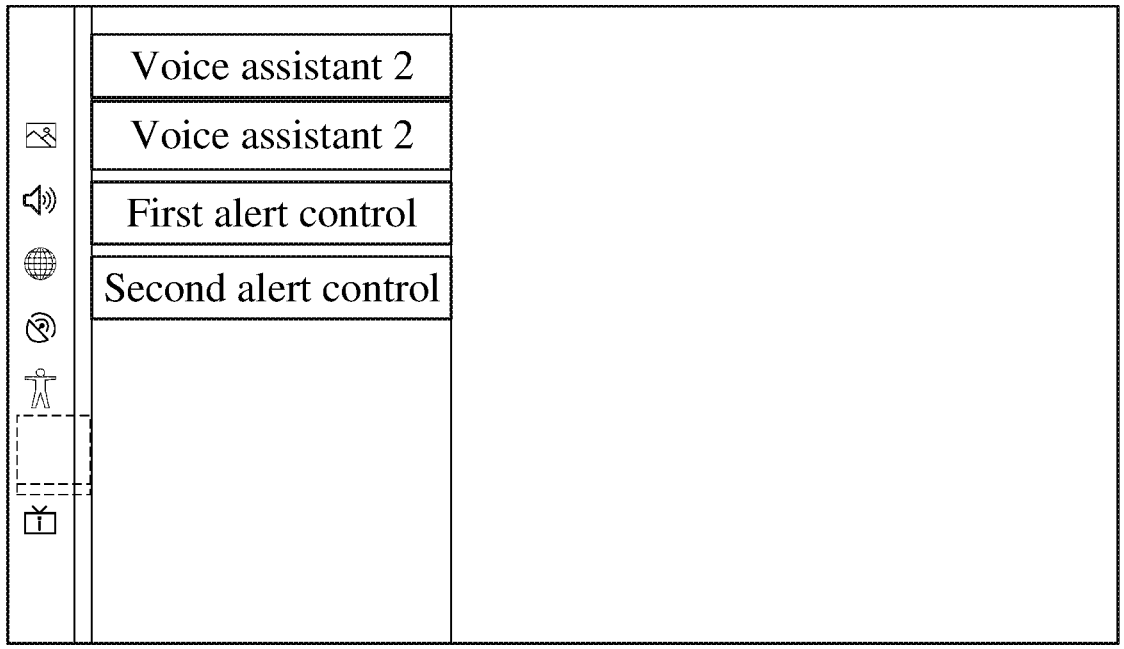
FIG. 19 is a schematic diagram of a setting interface according to some embodiments.
Figure 20:
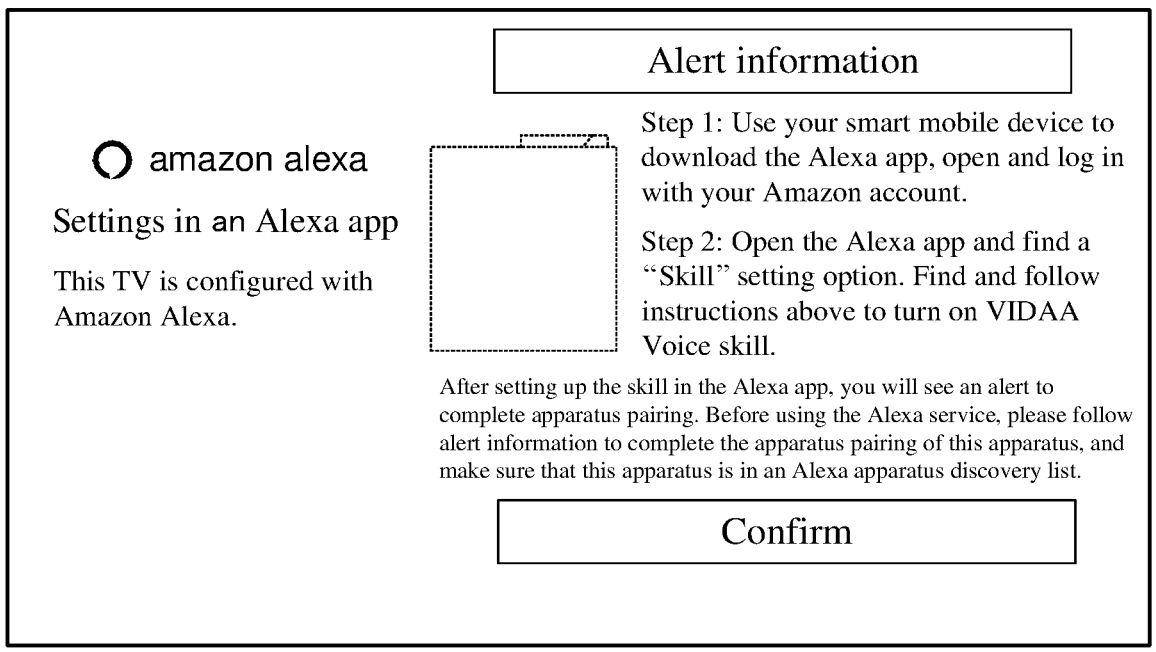
FIG. 20 is a schematic diagram of a binding alert interface according to some embodiments.

For example, continuing to take the display interface shown in FIG. 16 as an example, it can be seen that the display apparatus is provided with four voice assistants: the voice assistant 1, the voice assistant 2, the voice assistant 3, and the voice assistant 4, wherein the voice assistant 2 is not bound, when the user touches the identifier control corresponding to the voice assistant 2, the setting page displayed on the display may refer to FIG. 19, and it can be seen from FIG. 19 that the setting page is further provided with the first alert control. In response to the user's operation on the first alert control, the display displays the binding alert interface of the voice assistant 2, the binding alert interface may refer to FIG. 20, and it can be seen from FIG. 20 that the binding alert interface is configured to display the alert information of the binding process of the voice assistant. In response to the user' operation on the confirm control, the display displays a binding interface of the voice assistant 2, and the binding interface may refer to FIG. 18A and FIG. 18B.

In some embodiments, the setting page is further provided with a second alert control; and in response to the user's operation on the second alert control, the display displays an input alert interface, and the input alert interface is configured to display functions of the voice assistants.

Figure 21:
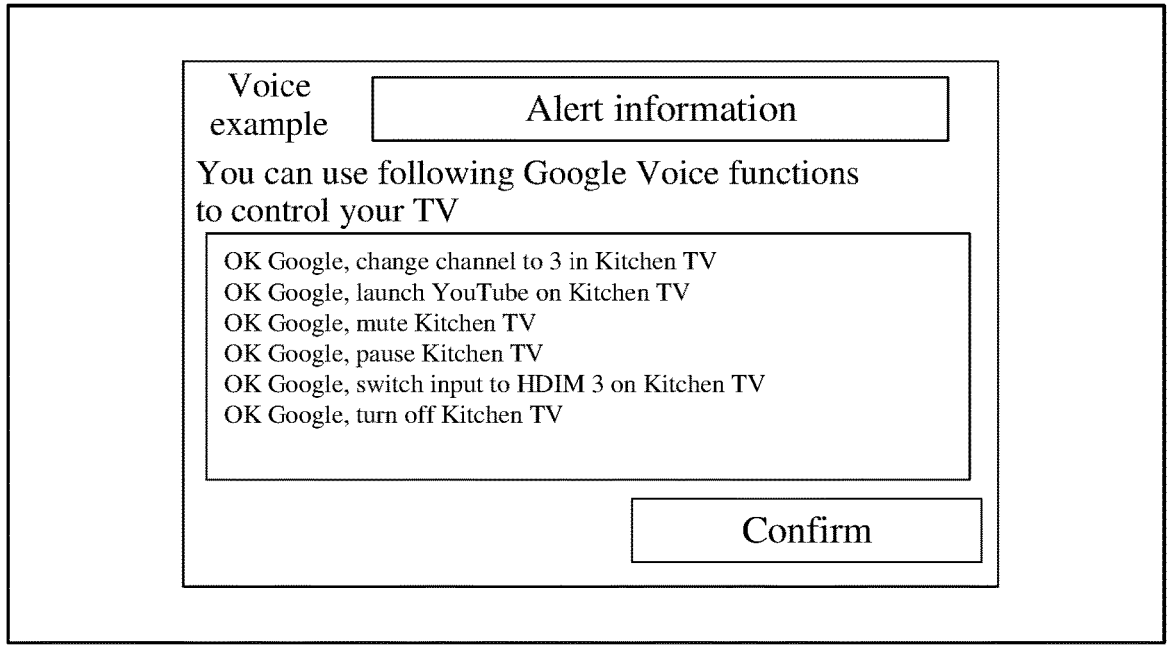
FIG. 21 is a schematic diagram of an input alert interface according to some embodiments.

For example, continuing to take the display interface shown in FIG. 16 as an example, it can be seen that the display apparatus is provided with four voice assistants: the voice assistant 1, the voice assistant 2, the voice assistant 3, and the voice assistant 4, wherein the voice assistant 1 has been bound, when the user operates the identifier control corresponding to the voice assistant 1, the setting page may refer to FIG. 17, and the setting page is further provided with the second alert control. In response to the user's operation on the second alert control, the input alert interface displayed on the display may refer to FIG. 21, and the input alert interface is configured to display the functions of the voice assistant.

Figure 22:
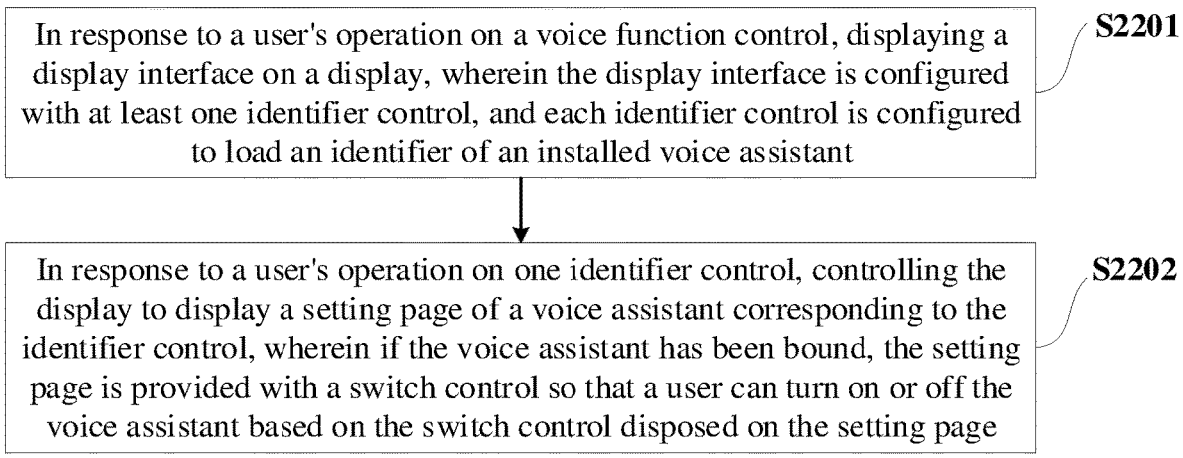
FIG. 22 is an operation flowchart of a display apparatus according to some embodiments.

The second aspect of the embodiment of the present disclosure shows a display apparatus. Components included in the display apparatus and the functions of each component may refer to the above-mentioned embodiments. An operation flowchart of the display apparatus may refer to FIG. 22. FIG. 22 is an operation flowchart of a display apparatus according to some embodiments. A controller of the display apparatus is configured to perform the following steps.

S2201, in response to a user's operation on a voice function control, a display interface is displayed on a display, the display interface is configured with at least one identifier control, and each identifier control is configured to load an identifier of an installed voice assistant.

Figures 23, 24:
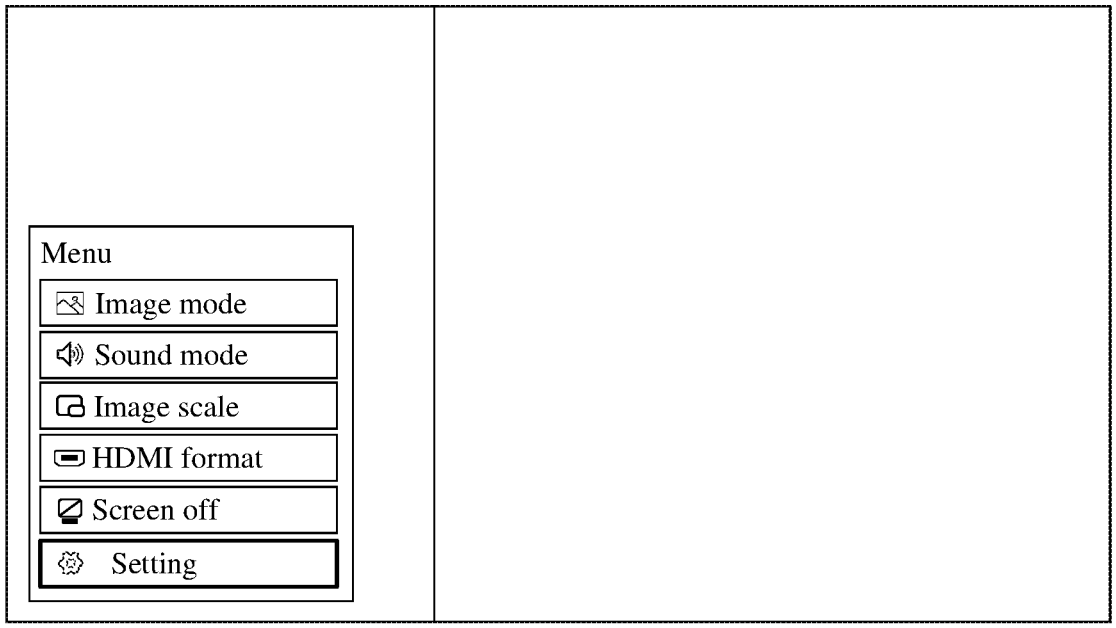
FIG. 23 is a schematic diagram of a display interface according to some embodiments.
FIG. 24 is a schematic diagram of a display interface according to some embodiments.

For example: in some embodiments, a user touches a setting button of a remote control, and an interface displayed on the display is as shown in FIG. 23. In response to the user's operation on a setting control, an interface displayed on the display is shown in FIG. 24. In response to the operation on the voice function control, the display interface is displayed on the display, wherein the display interface may continue to refer to FIG. 16.

S2202, in response to a user's operation on one identifier control, the display is controlled to display a setting page of a voice assistant corresponding to the control; and if the voice assistant has been bound and a control application is in a launch state, the setting page is provided with a switch control, so that the user can turn on or off the voice assistant based on the switch control disposed on the setting page.

This embodiment shows the display apparatus, and the user may call the display interface through the remote control. The display interface is configured with at least one identifier control, and each identifier control is configured to load the identifier of the installed voice assistant. In response to the user's operation on one identifier control, the display is controlled to display the setting page of the voice assistant corresponding to the control; and if the voice assistant has been bound, the setting page is provided with the switch control, so that the user can turn on or off the voice assistant by operating the switch control according to own preferences. With adoption of the display apparatus shown in the embodiment of the present disclosure, the user may realize the control over the bound voice assistants on the setting page, in this process, there is no need to switch between operation interfaces of the plurality of voice assistants, and the user experience is better.

In some feasible embodiments, if one voice assistant is not bound, in response to the user's operation on one identifier control, the display is controlled to display a binding interface of the voice assistant, so that the user can operate the corresponding control on the binding interface to realize binding of the voice assistant.

The binding process of the voice assistants may refer to the above-mentioned embodiments, which will not be repeated herein.

In some feasible embodiments, the setting page is further provided with a first alert control; the controller is also configured to: if one voice assistant is not bound, in response to the user's operation on the first alert control, control the display to display a binding alert interface of the voice assistant, wherein the binding alert interface is configured to display alert information of binding process of the voice assistant; if the control application is in a closed state, in response to a user's confirm operation, control the display to display a login interface of the control application, so that the user can fill in user information on the login interface to realize the launch of the control application; and in response to launch of the control application, control the display to display the binding interface of the voice assistant, so that the user can operate the corresponding control on the binding interface to realize binding of the voice assistant.

Figure 25:
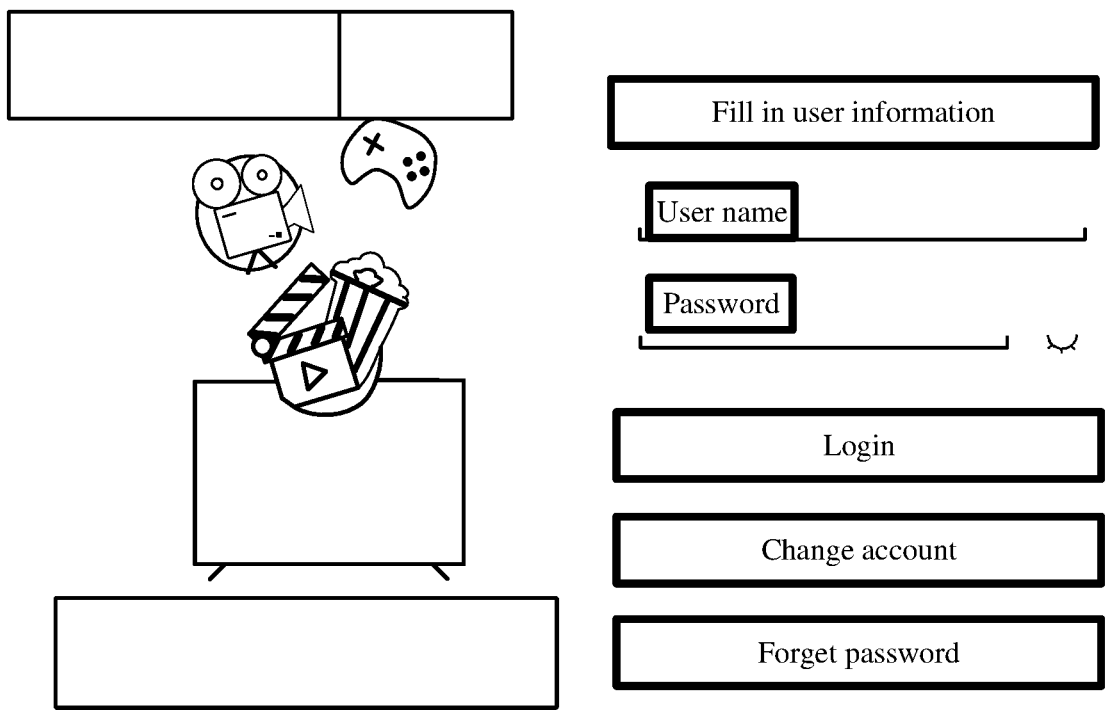
FIG. 25 is a schematic diagram of a login interface according to some embodiments.

For example, continuing to take the display interface shown in FIG. 16 as an example, it can be seen that the display apparatus is provided with four voice assistants: a voice assistant 1, a voice assistant 2, a voice assistant 3, and a voice assistant 4, wherein the voice assistant 2 is not bound, when the user operates the identifier control corresponding to the voice assistant 2, the setting page displayed on the display may refer to FIG. 19, and the setting page is further provided with the first alert control. In response to the user's operation on the first alert control, the display displays the binding alert interface of the voice assistant 2, the binding alert interface may refer to FIG. 20, and the binding alert interface is configured to display the alert information of binding process of the voice assistant. In the present disclosure, the control application is in the closed state, in response to the user's confirm operation, the display displays the login interface of the control application, the login interface may refer to FIG. 25, and the user can fill in the user information on the login interface to realize the launch of the control application; and in response to the launch of the control application, the display is controlled to display the binding interface of the voice assistant, so that the user can operate the corresponding control on the binding interface to realize binding of the voice assistant.

In some feasible embodiments, the setting page is further provided with a second alert control; and in response to the user's operation on the second alert control, the display is controlled to display the alert information, and the alert information is configured to display functions of the voice assistants.

In some feasible embodiments, the controller is also configured such that each voice assistant may be bound with different display apparatuses.

Third Aspect.

In some embodiments, when a display apparatus is connected to the Internet to expand the application functions of the display apparatus, the display apparatus may be controlled to present corresponding content through voice interaction. For example, when the display apparatus is a smart TV, the smart TV is connected to the Internet to realize an Internet TV function, and the Internet TV may be controlled to present different content through the voice function. The voice function includes Alex, Google or Yandex, etc. The voice function is divided into a controlled scheme and a main control scheme. The controlled scheme is mainly to directly control the TV through a remote control or a remote now APP. The main control scheme is to directly act on the TV through the remote control.

The controlled scheme is mainly to control the display apparatus through devices provided by a third-party organization, such as google sound, Alex sound and other smart terminals. For the controlled scheme, the display apparatus is required to first log in with a user account, bind the user account and the display apparatus, and then use the voice function configured in the display apparatus to operate the display apparatus. The user account may be a VIDAA account, and the display apparatus may be connected to a VIDAA server through the VIDAA account to realize a network TV function of the display apparatus. The VIDAA server is a high-definition Internet server integrating Network video, local playback and APP applications, and a user may watch network movies and TV shows for free, and experience different applications on the display apparatus through the VIDAA server.

Since a current user account requires that a display apparatus with a duplicate name under one user account is not allowed, once there is a display apparatus with the duplicate name, the display apparatus will not function, that is, the voice function cannot be called to control the display apparatus. Therefore, it is necessary to detect whether there is a display apparatus with the duplicate name under the user account. At present, the duplicate detecting process is only performed when the user logs in with the user account. In other words, if the user wants to control the display apparatus through voice interaction, the user needs to log in with the user account and name a currently logged-in display apparatus. At this time, duplicate names of the display apparatus are detected, and in the next step, only the corresponding voice function switch needs to be turned on. However, in this method, once the user account is logged in, when the voice switch is turned on later multiple times, there is no need to detect the duplicate name of the display apparatus, the user does not know whether the name of the display apparatus is the same as that of other display apparatuses, once the display apparatus with the duplicate name exists, the display apparatus will not indicate the user that there is a display apparatus with the duplicate name under the user account when the user uses the voice function, and the voice function is not available at this time, resulting in the user not knowing why the voice of the display apparatus does not function, and the user experience is not good.

Figure 26:
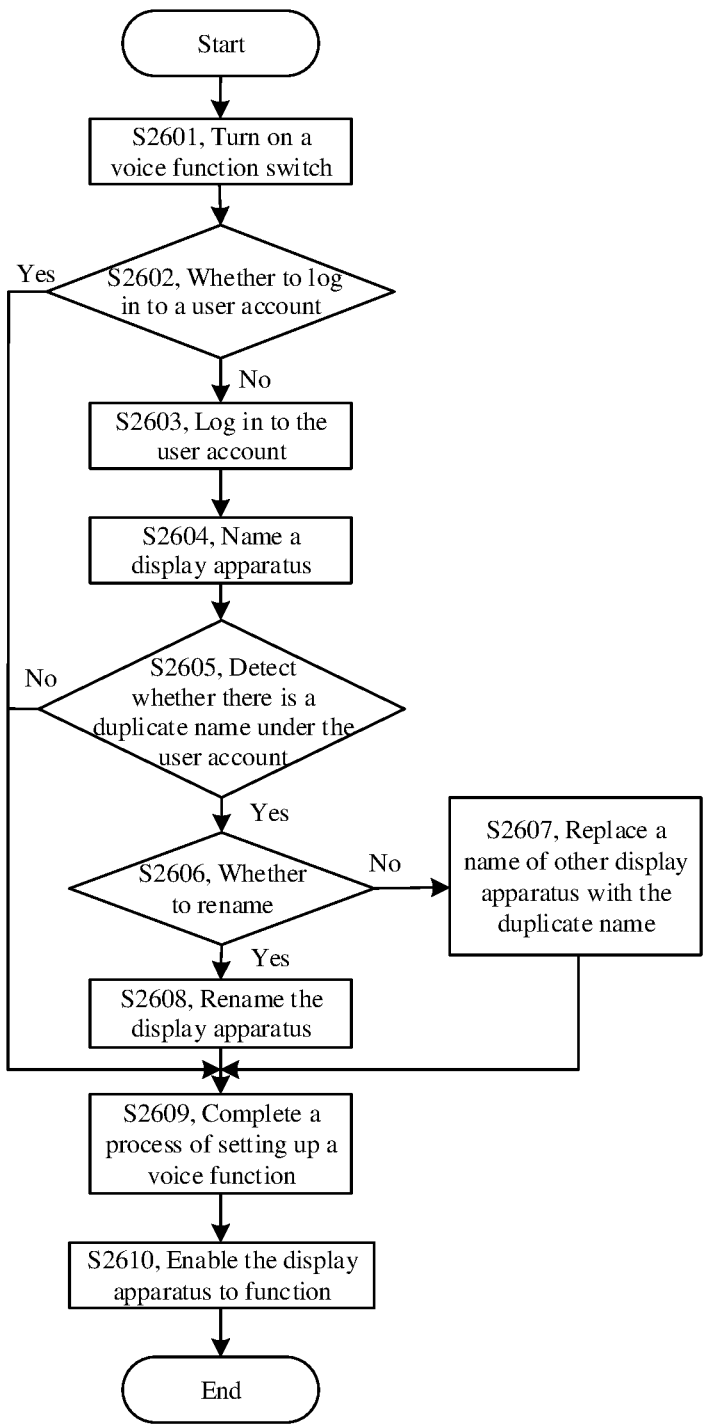
FIG. 26 is a data flow diagram of an original duplicate name detection method according to some embodiments.

FIG. 26 is a data flow diagram of an original duplicate name detection method according to some embodiments. Referring to FIG. 26, when the voice function of the currently logged-in display apparatus operated by the user is turned on (S2601), whether the user logs in to the display apparatus by the user account is detected (S2602), if not, the user account is logged in first (S2603), and at the same time, the display apparatus is named (S2604). After the naming is completed, whether there are other display apparatuses with the duplicate name as the display apparatus under the user account is detected (S2605). If there are duplicate names, the currently logged-in display apparatus is bound with the user account after renaming, so that the voice function of the currently logged-in display apparatus is used to control the display apparatus; that is, whether to rename is determined (S2606), if yes, the display apparatus is renamed (S2608), then a process of setting up a voice function is completed (S2609) and the display apparatus is enabled to function (S2610).

If there are duplicate names and renaming is not performed, the name of the other display apparatuses will be replaced, that is, the name generating duplication of name will be occupied by the currently logged-in display apparatus (S2607). At this time, if the voice service of the other display apparatuses with the duplicate name is not started, the other display apparatuses will not detect that their names have been replaced with another display apparatus (the currently logged-in display apparatus). At this time, even if the user turns on voice switches of the other display apparatuses, the voice functions of the other display apparatuses do not function, and the user does not know why the voice function of the display apparatus is unavailable.

However, if the voice services of the other display apparatuses with the duplicate name have been started, the other display apparatuses with the duplicate name will pop up that their names have been replaced and need to be changed again. After the user changes the names, if the voice services are not closed for restarting, the voice functions are unavailable, and the user does not know why the voice function of the display apparatus is unavailable.

If the voice function of the currently logged-in display apparatus operated by the user is turned on, it is detected that the display apparatus has been logged in with the user account, or if there is no other display apparatus with the duplicate name under the user account, the user may directly enter a voice function setting process (S2609) and the display apparatus turns on the voice function (S2610).

It can be seen that when the existing detection method is used for duplicate name detection, there will be situations where the display apparatus still has the duplicate name and the voice function of the display apparatus is unavailable, and the user will not be indicated. At the same time, the user does not know why the voice is unavailable. Even if the display apparatus knows that its display apparatus name is used by other apparatuses under the same user account, the display apparatus is reminded to modify the display apparatus name again, and after the name is modified, the voice function of the display apparatus is still unavailable.

Therefore, in order to ensure that the voice function of the display apparatus can be used normally, an embodiment of the present disclosure provides a display apparatus duplicate name detection optimization mechanism. Every time the display apparatus needs to use the voice function, the user needs to name the display apparatus, and at the same time, whether there are display apparatuses with the duplicate name under the logged-in user account is detected, if yes, it will indicate that the same display apparatus name exists under the user account, the user is indicated to rename, at the same time, the user is indicated that if the name of the original display apparatus is replaced, another display apparatus will not function. If another display apparatus detects that its display apparatus name is replaced with other display apparatuses, the another display apparatus will indicate that the voice function is unavailable at this time for the user, and the voice function needs to be reset. It can be seen that the display apparatus with the name replaced will display more accurate alert to let the user know that the name of the display apparatus has been replaced and the voice function is not available at this time, the user experience is greatly improved, and the problem that the voice function of the display apparatus does not function due to the duplication of name of the display apparatus is solved.

Figure 27:
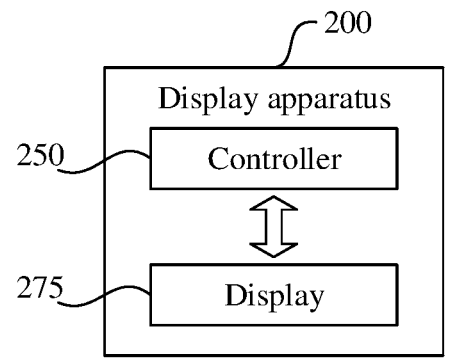
FIG. 27 is a structural block diagram of a display apparatus according to some embodiments.

FIG. 27 is a structural block diagram of a display apparatus according to some embodiments. In order to implement the duplicate name detection optimization mechanism, referring to FIG. 27, a display apparatus 200 provided by an embodiment of the present disclosure includes: a display 275 configured to display an alert interface; and a controller 250 connected to the display 275, and configured with a voice function, so that when the voice function is turned on, the display apparatus may be operated through voice interaction, and content obtained by the display apparatus from the Internet is displayed on the display.

Since whether the voice function of the display apparatus is turned on or not determines whether it will receive an alert that the name is replaced when a currently logged-in display apparatus has a duplicate name, based on whether the voice function of a local device is turned on, different duplicate name detection methods are performed, and the local device refers to a device which has been logged in with a user account.

Figure 28:
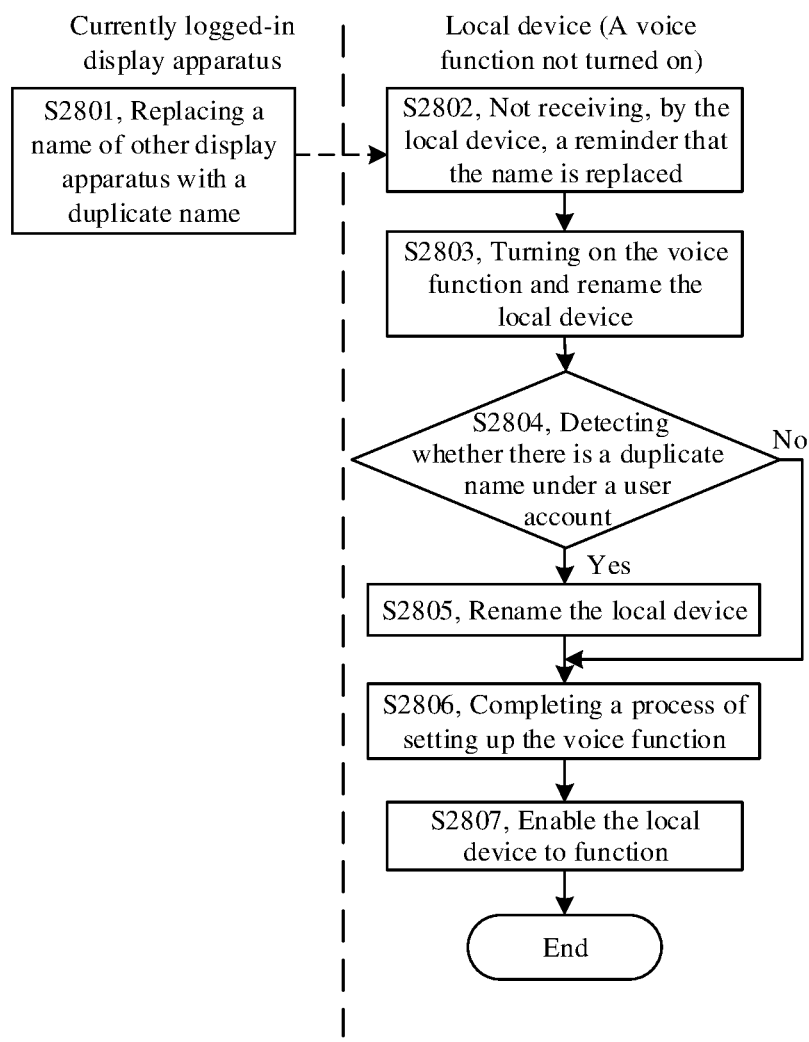
FIG. 28 is a data flow diagram of a duplicate name detection method of a display apparatus according to some embodiments.

FIG. 28 is a data flow diagram of a duplicate name detection method of a display apparatus according to some embodiments. Referring to FIG. 28, when the duplicate name detection optimization mechanism is performed under the condition that the voice function of the local device is not turned on, a controller configured for the display apparatus provided by the embodiment of the present disclosure is configured to perform the following steps.

When a currently logged-in display apparatus with the duplicate name as the local device exists under the user account and the currently logged-in display apparatus is not renamed, if the voice function of the local device is turned on, the local device is named, when it is detected that there is no other display apparatus with the duplicate name under the user account, the voice function of the local device is turned on, wherein the local device refers to a device which has been logged in with the user account and has not turned on the voice function.

When the user operates the currently logged-in display apparatus to bind the user account, if the controller of the currently logged-in display apparatus detects that there is a local device with the duplicate name as the currently logged-in display apparatus under the user account and the currently logged-in display apparatus is not renamed, the corresponding name generating duplication of name will be replaced with the currently logged-in display apparatus (S2801), and the name of the local device will be replaced. For example, if the name "Bedroom TV" generates duplication of name, the name will be used as the name of the currently logged-in display apparatus, and the local device originally named "Bedroom TV" will no longer have this name.

In this case, although the voice function of the local device is not turned on and the alert that the name has been replaced cannot be received (S2802), in order to ensure the normal use of the voice function of the local device, when the voice function of the local device is turned on, the local device needs to be named (S2803), and the process of naming occurs every time the voice function is turned on, that is, as long as the local device turns on the voice function once, the local device needs to be named. After the naming is completed, whether there are other display apparatuses with the duplicate name under the user account is detected (S2804), if not, the voice function may be directly invoked, and if yes, an alert will pop up to the user, so that the user can rename the local device in the case of knowing duplication of name (S2805). When the name of the local device and the logged-in display apparatus under the user account do not have the duplicate name, the voice function of the local device may be turned on to control the display apparatus through voice interaction, that is, a process of setting up the voice function is completed (S2806), and the local device is enabled to function (S2807).

Figure 29:
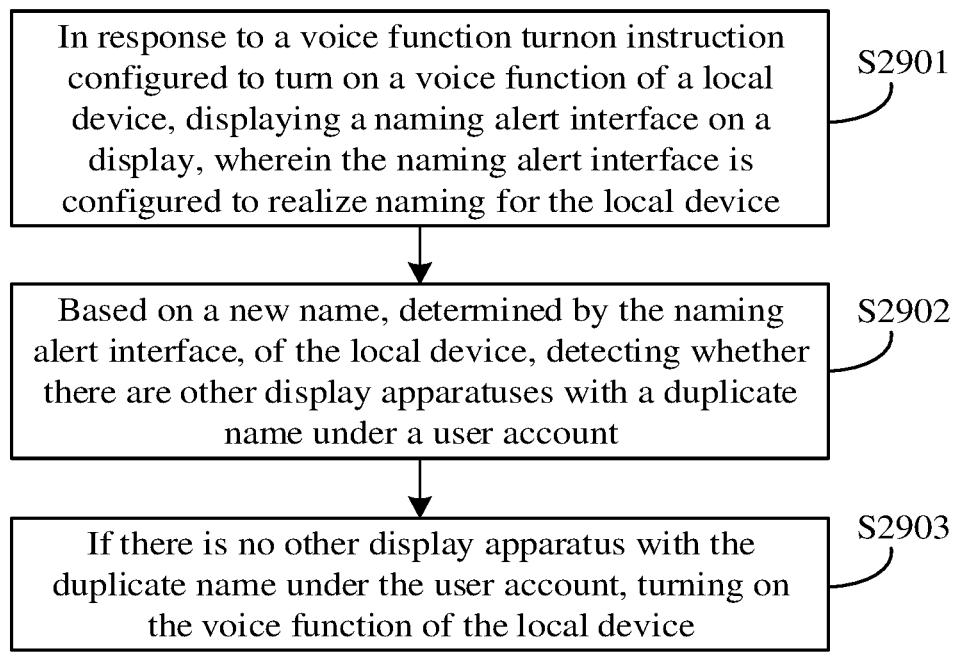
FIG. 29 is a flowchart of a method for detecting duplicate names on a local device according to some embodiments.
Figure 30:
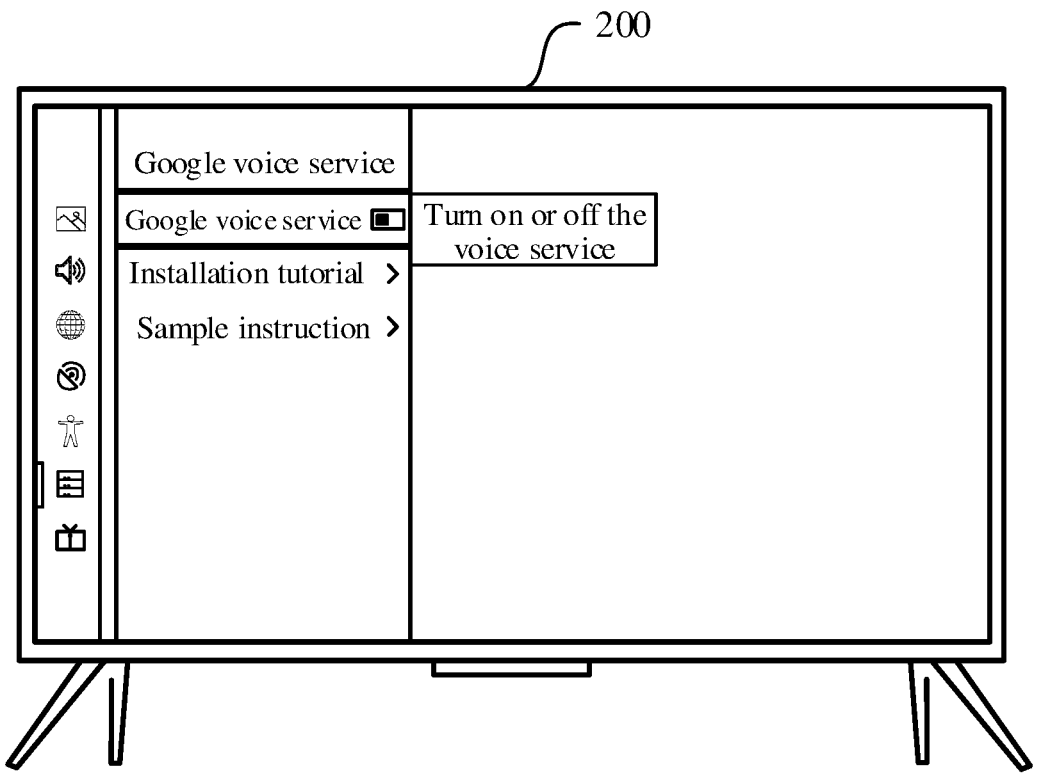
FIG. 30 is a schematic display diagram of turning on a voice function according to some embodiments.

FIG. 29 is a flowchart of a method for detecting duplicate names on a local device according to some embodiments; and FIG. 30 is a schematic display diagram of turning on a voice function according to some embodiments. Referring to FIG. 29 and FIG. 30, in some embodiments, in order to ensure that the local device may still turn on the voice function normally in the case of duplication of name, a controller of the local device is configured to name the local device when the voice function of the local device is turned on, and turn on the voice function of the local device when it is detected that there is no other display apparatus with the duplicate name under the user account, and is further configured to perform the following steps.

S2901, in response to a voice function turnon instruction configured to turn on the voice function of the local device, a naming alert interface is displayed on a display, wherein the naming alert interface is configured to realize naming for the local device.

S2902, based on a new name, determined by the naming alert interface, of the local device, whether there are other display apparatuses with the duplicate name under the user account is detected.

S2903, if there is no other display apparatus with the duplicate name under the user account, the voice function of the local device is turned on.

When the user operates the local device to turn on the voice function, a "Google Voice Service" control is displayed in a voice function turnon interface of the display apparatus, and the user clicks on the control to execute the function of turning on or off the voice service and generate a voice function turnon instruction. After the controller of the local device receives the voice function turnon instruction, the naming alert interface is generated and displayed on the display.

Figure 31:
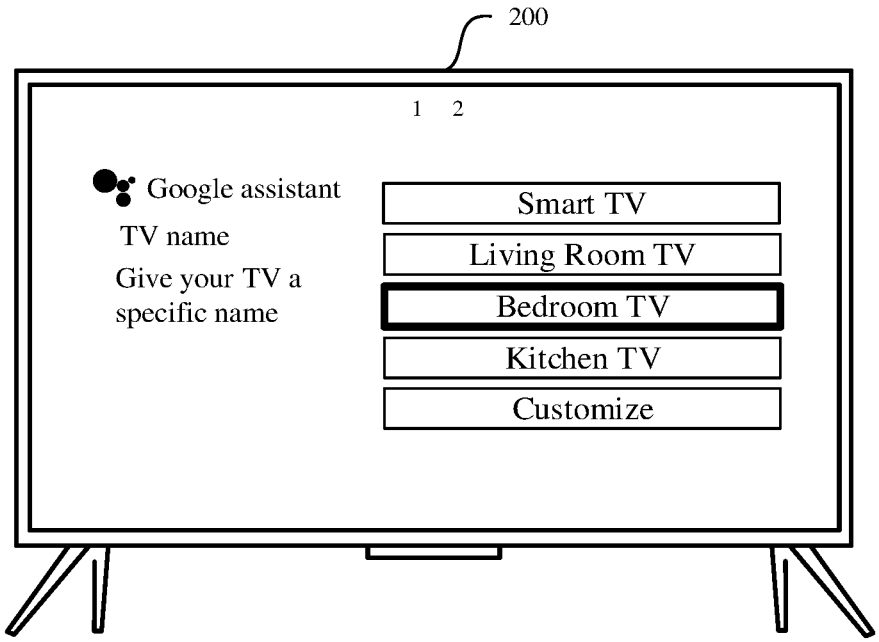
FIG. 31 is a schematic display diagram of a naming alert interface according to some embodiments.

FIG. 31 is a schematic display diagram of a naming alert interface according to some embodiments. Referring to FIG. 31, an alert text and naming options are displayed in the naming alert interface. The alert text is configured to indicate the user of alert content of the alert interface, for example, "Give your TV a specific name", and the user learns that the local device needs to be named at present after seeing the alert text.

The naming options are default names or custom items provided by a system. In FIG. 31, the default name "Smart TV" is a smart TV, "Living Room TV" is a living room TV, "Bedroom TV" is a bedroom TV, and "Kitchen TV" is a kitchen TV; "Customize" is a custom item, and when clicking on the custom item, the user may customize the name.

After the user completes the naming for the local device based on the naming alert interface, based on the new name, the controller detects whether there are other display apparatuses with the duplicate name as the new name under the user account with which the user logs in, and the other display apparatuses refer to those logged in with the user account.

If it is detected that there is no other display apparatus with the duplicate name under the user account, it means that the process of setting up the voice function may be performed normally, and the voice function of the local device may be turned on to realize the control over the display apparatus through voice interaction.

Figure 32:
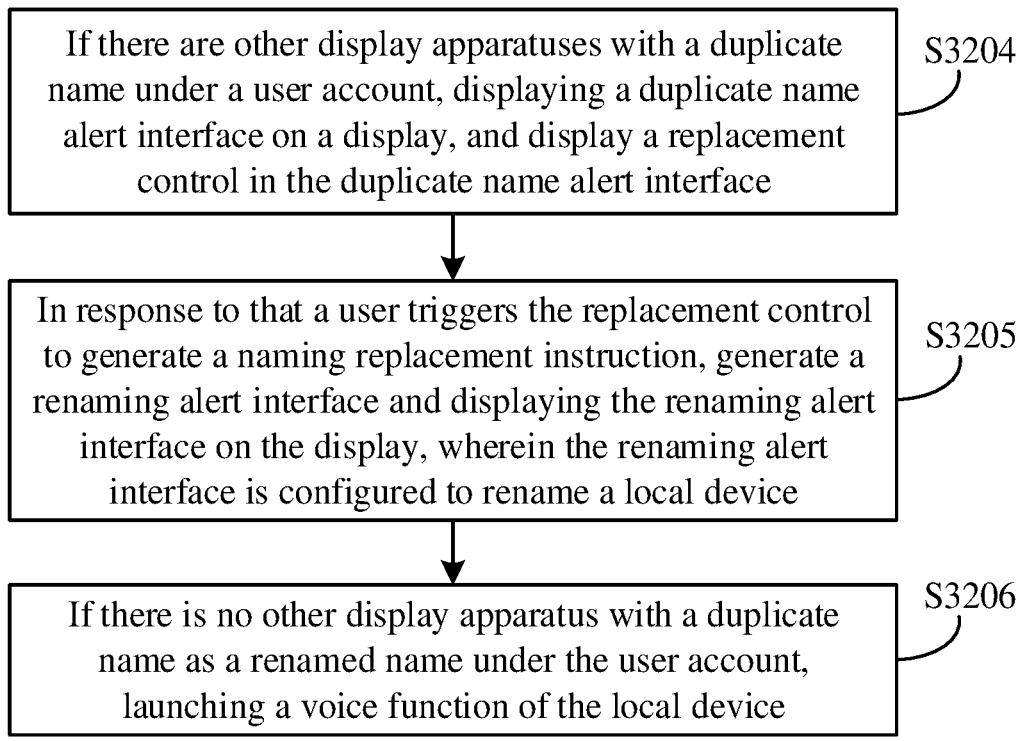
FIG. 32 is a flowchart of another method for detecting duplicate names on a local device according to some embodiments.
Figure 33:
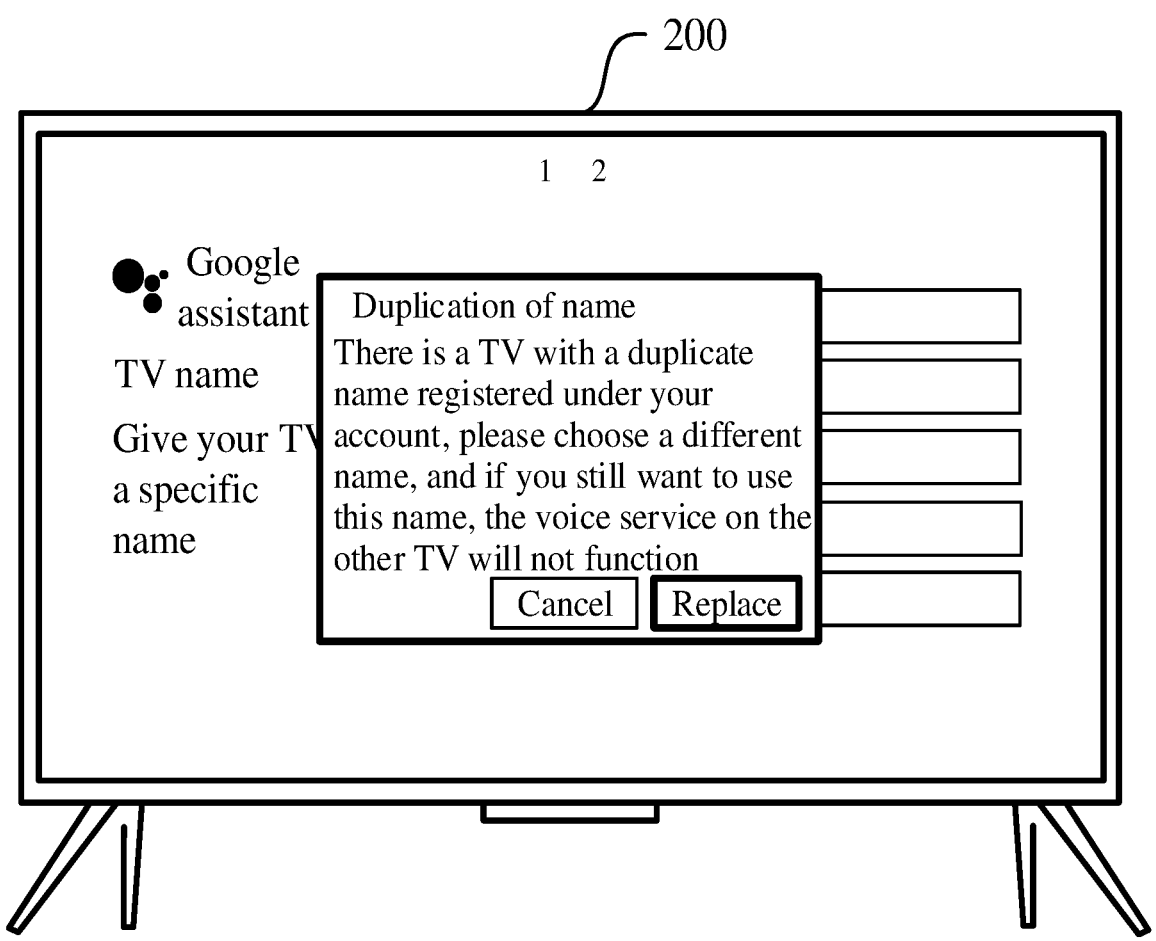
FIG. 33 is a schematic display diagram of a duplicate name alert interface according to some embodiments.

FIG. 32 is a flowchart of another method for detecting duplicate names on the local device according to some embodiments; and FIG. 33 is a schematic display diagram of a duplicate name alert interface according to some embodiments. Referring to FIG. 32 and FIG. 33, in some embodiments, if the name of the local device is the same as those of other display apparatuses, a controller of the local device is further configured to perform the following steps.

S3204, if there are other display apparatuses with the duplicate name under the user account, the duplicate name alert interface is displayed on a display, and a replacement control is displayed in the duplicate name alert interface.

S3205, in response to that a user triggers the replacement control to generate a naming replacement instruction, a renaming alert interface is generated and displayed on the display, wherein the renaming alert interface is configured to rename the local device.

S3206, if there is no other display apparatus with the duplicate name as a renamed name under the user account, a voice function of the local device is turned on.

If the controller of the local device detects other display apparatuses with the duplicate name as the new name of the local device under the user account, in order to facilitate the user performing corresponding operations, it is necessary to indicate the user of the duplication of name That is, the controller generates the duplicate name alert interface shown in FIG. 33 and displays the interface on the display of the local device. The duplicate name alert interface is displayed on an upper layer of the naming alert interface in a superimposed mode. That is, when the duplicate name alert interface is displayed, the naming alert interface does not disappear. The user sees the duplicate name alert interface that pops up on the display of the local device, and then knows that the name of the local device conflicts with other apparatuses and needs to modify the name, otherwise the voice function cannot be turned on.

The duplicate name alert interface includes an alert text, a cancel control, and a replacement control. The alert text is configured to indicate the user that there is duplication of name, and inform the user of the subsequent operations to be performed. The text content may be "You have registered a TV with the duplicate name under your account. Please choose a different name. If you still want to use this name, the voice service on another TV will not function"; the cancel control is configured to realize that the user does not change the duplicate name, and the duplicate name alert interface is controlled to disappear by clicking on the cancel control; and the replacement control is configured to realize that the user changes the duplicate name, the duplicate name alert interface disappears by clicking on the replacement control, and the naming alert interface is displayed.

If the user triggers the cancel control, the local device will replace the new name generating duplication of name, and the names of other display apparatuses with the duplicate name will be deprived. As a result, the names of the other display apparatuses do not exist under the user account, and the voice function of other display apparatuses is unavailable.

If the user triggers the replacement control, a naming replacement instruction is generated, and the controller of the local device generates the renaming alert interface in response to the naming replacement instruction, and displays the renaming alert interface on the display. The renaming alert interface may be the same as the naming alert interface shown in FIG. 31, which will not be repeated herein.

The user renames the local device based on the renaming alert interface, and detects again whether there are other display apparatuses with the duplicate name under the user account, and the naming and detection process is repeated until the name of the local device is different from the names of other display apparatuses under the user account, so that the voice function of the local device can be turned on to control the display apparatus through voice interaction.

It can be seen that when the currently logged-in display apparatus has the duplicate name as the local device and has not been renamed, the currently logged-in display apparatus replaces this name. Although the local device cannot receive the alert that the name has been replaced because the voice function is not turned on, when the voice function of the local device is turned on, it is necessary to perform the steps of renaming the local device and detecting whether there are other display apparatuses with the duplicate name under the user account. When it is detected that there are other display apparatuses with the duplicate name, the duplicate name alert interface pops up on the display to inform the user that a display apparatus with the duplicate name already exists under the same user account, so that the user can know that the display apparatus needs to be renamed again in this case so as to not conflict with other display apparatuses, thereby ensuring the normal use of the voice function of the local device and improving the user experience.

Figure 34:
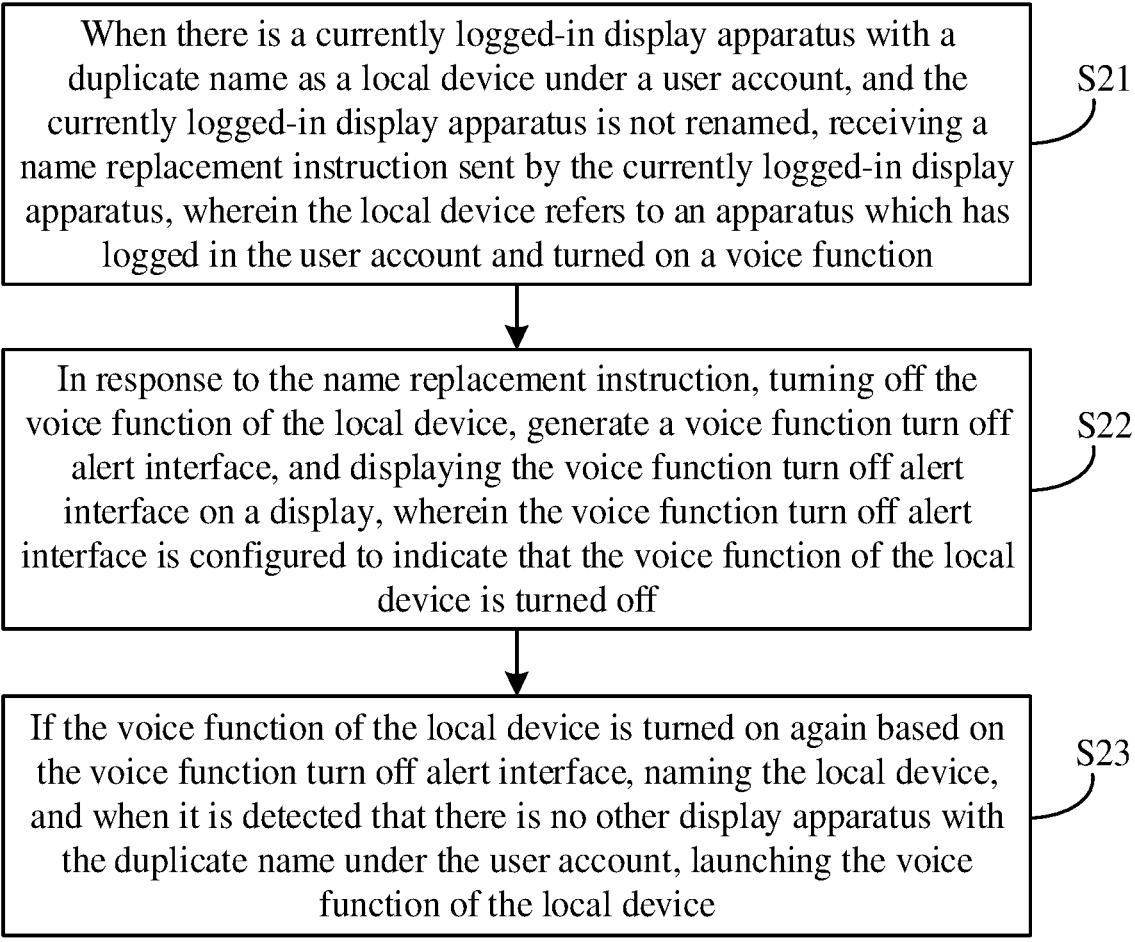
FIG. 34 is a flowchart of a duplicate name detection method of a display apparatus according to some embodiments.
Figure 35:
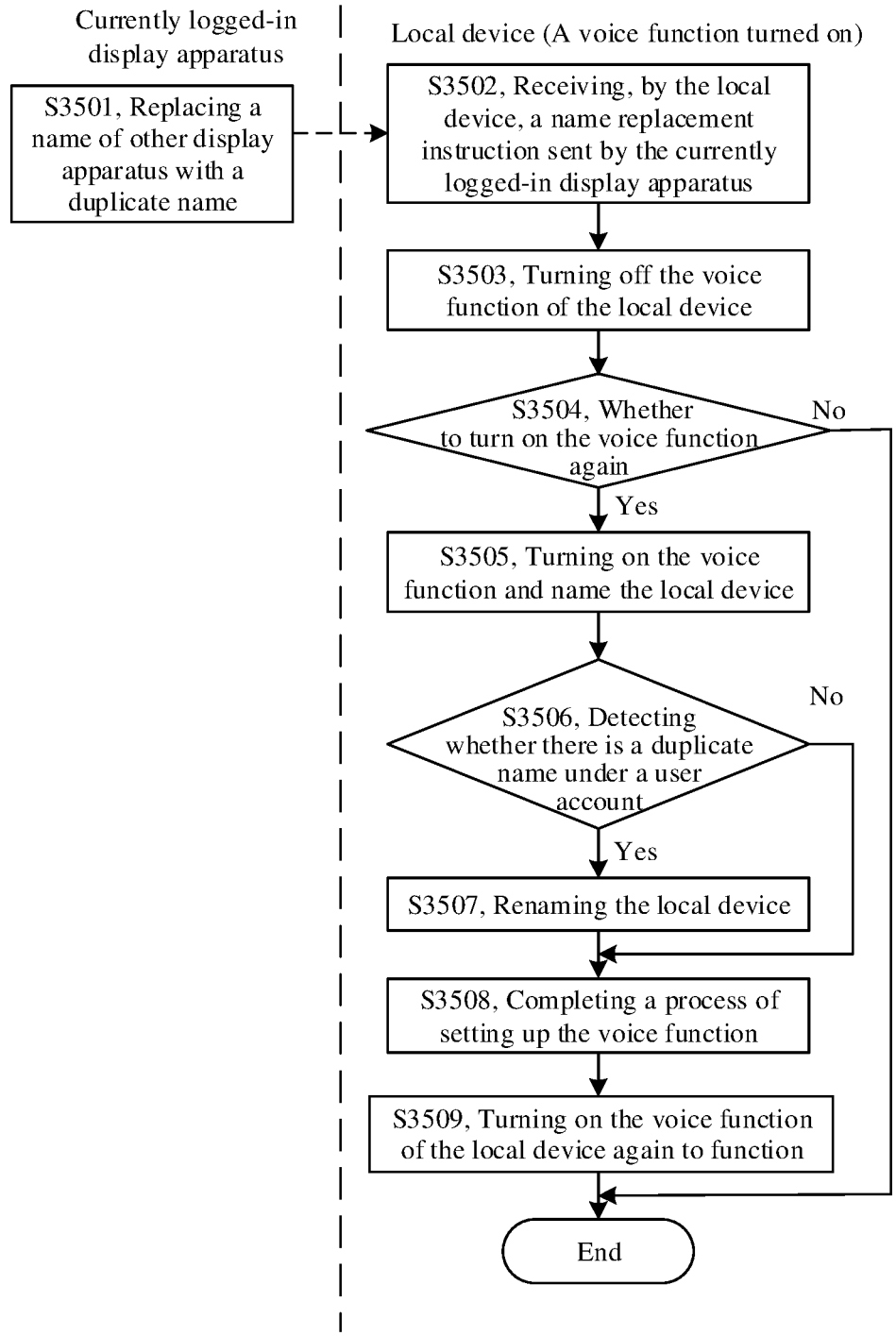
FIG. 35 is another data flow diagram of a duplicate name detection method of a display apparatus according to some embodiments.

FIG. 34 is a flowchart of a duplicate name detection method of a display apparatus according to some embodiments; and FIG. 35 is another data flow diagram of a duplicate name detection method of a display apparatus according to some embodiments.

Referring to FIG. 34 and FIG. 35, when the duplicate name detection optimization mechanism is executed in the case that a voice function of a local device is turned on, a controlled configured for a display apparatus provided by an embodiment of the present disclosure is configured to perform the following steps.

S21, when there is a currently logged-in display apparatus with a duplicate name as the local device under a user account, and the currently logged-in display apparatus is not renamed, a name replacement instruction sent by the currently logged-in display apparatus is received, wherein the local device refers to a device which has been logged in with the user account and turned on a voice function.

When the user operates the currently logged-in display apparatus to bind the user account, if a controller of the currently logged-in display apparatus detects that there is a local device with the duplicate name under the user account, and the name of the currently logged-in display apparatus is not renamed, the corresponding name generating duplication of name is replaced with the currently logged-in display apparatus (S3501), and then the name of the local device will be replaced, that is, the voice function of the local device will be turned off.

In this case, because the local device has turned on the voice function, the name replacement instruction sent by the currently logged-in display apparatus may be received (S3502). After the controller of the local device receives the name replacement instruction, it may be learned that the name of the local device is replaced.

S22, in response to the name replacement instruction, the voice function of the local device is turned off, and a voice function turnoff alert interface is generated and displayed on a display, wherein the voice function turnoff alert interface is configured to indicate that the voice function of the local device is turned off.

To ensure the normal use of the voice function of the local device, after the name of the local device is replaced, the voice function of the local device needs to perform a restart process. Therefore, in response to the name replacement instruction, the controller of the local device turns off the voice function of the local device (S3503), and at the same time, generates the voice function turnoff alert interface and displays the voice function turnoff alert interface on the display. If the local device has been turned on, the voice function turnoff alert interface may be displayed directly on the display of the local device in a popup manner; and if the local device is turned off, the voice function turnoff alert interface is displayed on the display after the local device is turned on. Whether to turn on the voice function again is determined (S3504), if yes, the voice function is turned on and the local device is named (S3505); then whether there is a duplicate name under a user account is detected (S3506), if yes, the local device is renamed (S3507); after the local device is renamed (S3507) or when detecting there is no duplicate name under a user account, a process of setting up the voice function is completed (S3508); and then the voice function of the local device is turned on again to function (S3509).

Figure 36:
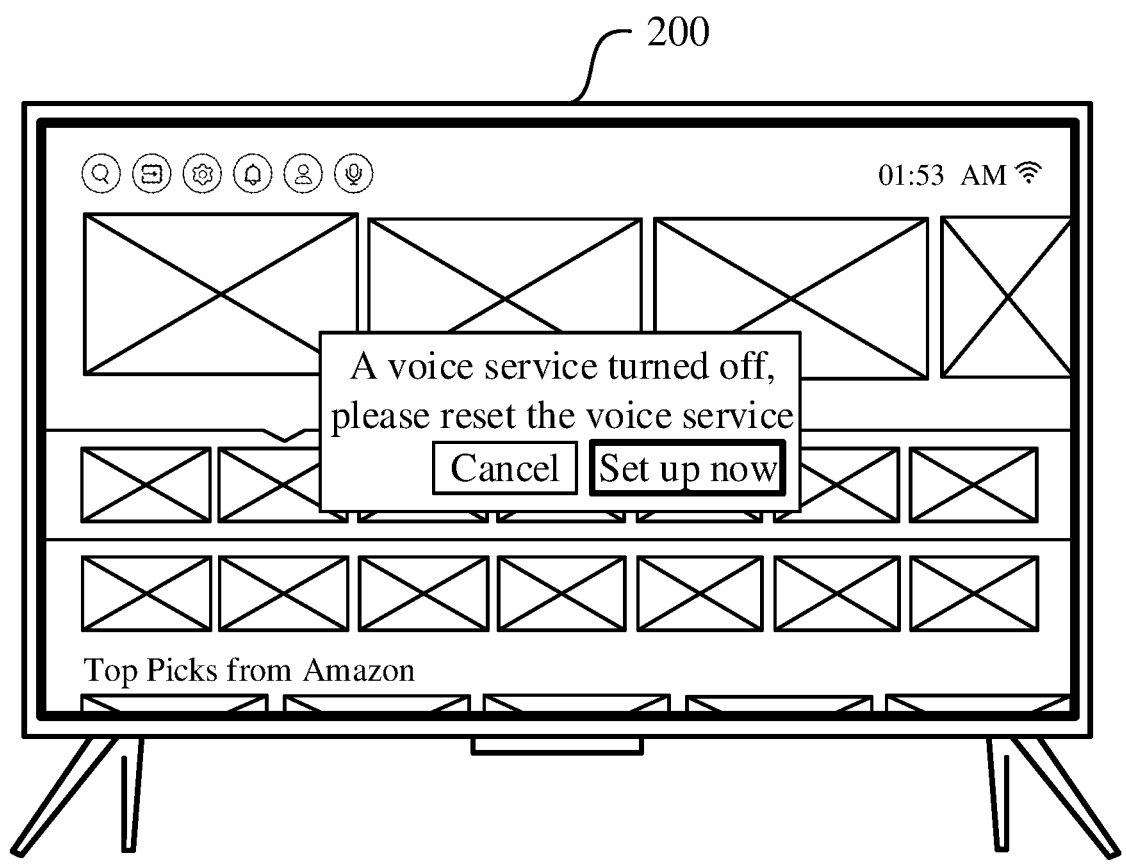
FIG. 36 is a schematic display diagram of a voice function turnoff alert interface according to some embodiments.

FIG. 36 is a schematic display diagram of a voice function turnoff alert interface according to some embodiments. Referring to FIG. 36, the voice function turnoff alert interface includes an alert text, a cancel control and a setting control. The alert text is configured to indicate that the voice function of the local device has been completed and subsequent operation alerts for the user. The text content may be "Voice service turned off, please reset voice service"; the cancel control is configured to realize that the voice function of the local device is no longer set; and the setting control is configured to realize that the voice function of the local device needs to be set again.

If the voice function of the local device is not turned on again based on the voice function turnoff alert interface, the display of the voice function turnoff alert interface will be cancelled. That is, if the user clicks on the cancel control, the display of the voice function turnoff alert interface is cancelled, indicating that the user does not need to use the voice function. If the user clicks on the setting control, the display of the voice function turnoff alert interface is cancelled, and the voice function turnon interface is displayed. The voice function turnon interface is shown in FIG. 30. The user can realize the process of setting up the voice function based on the voice function turnon interface.

S23, if the voice function of the local device is turned on again based on the voice function turnoff alert interface, the local device is named, and when it is detected that there is no other display apparatus with the duplicate name under the user account, turning on of the voice function of the local device is realized.

Based on the voice function turnoff alert interface, the user may perform an operation of not turning on the voice function, and may also perform an operation of turning on the voice function again. If the voice function is turned on again, the local device needs to be renamed, and the voice function of the local device may be turned on again only after it is detected that there is no other display apparatus with the duplicate name under the same user account.

In some embodiments, the controller of the local device is configured to turn on the voice function of the local device again based on the voice function turnoff alert interface, and is further configured to perform the following steps.

Step 2311, a voice function setting instruction generated when the user triggers the setting control display on the voice function turnoff alert interface is received.

Step 2312, in response to the voice function setting instruction, the voice function turnon interface is generated and displayed on the display.

If the user needs to turn on the voice function of the local device again, the user clicks on the setting control in the voice function turnoff alert interface to generate the voice function setting instruction. In response to the voice function setting instruction, the controller of the local device cancels the display of the voice function turnoff alert interface on the display of the local device, and displays the voice function turnon interface.

Referring to FIG. 30 again, the user clicks on the "Google Voice Service" control displayed in the voice function turnon interface to execute the function of turning on or off the voice service, and to generate a voice function turnon instruction. Displayed content of the voice function turnon interface may refer to the content provided in the above-mentioned embodiments, which will not be repeated herein.

In some embodiments, when the local device needs to be renamed, the controller of the local device is configured to name the local device and turn on the voice function of the local device when it is detected that there is no other display apparatus with the duplicate name under the user account, and is further configured to perform the following steps.

Step 2321, in response to the voice function turnon instruction configured to turn on the voice function of the local device, the naming alert interface is displayed on the display, wherein the naming alert interface is configured to realize naming of the local device.

Step 2322, based on the new name, determined by the naming alert interface, of the local device, whether there are other display apparatuses with the duplicate name under the user account is detected.

Step 2323, if there is no other display apparatus with the duplicate name under the user account, the voice function of the local device is turned on.

When the voice function of the local device needs to be turned on again, the local device needs to be renamed and subjected to duplication detection. For the specific implementation process, refer to the content of steps S101 to S103 provided in the above-mentioned embodiments accordingly, which will not be repeated herein.

In some embodiments, if the name of the local device is the same as those of other display apparatuses, the controller of the local device is further configured to perform the following steps.

Step 2324, if there are other display apparatuses with the duplicate name under the user account, the duplicate name alert interface is displayed on the display, and the replacement control is displayed in the duplicate name alert interface.

Step 2325, in response to that the user triggers the replacement control to generate the naming replacement instruction, the renaming alert interface is generated and displayed on the display, wherein the renaming alert interface is configured to rename the local device.

S2326, if there is no other display apparatus with the duplicate name as a renamed name under the user account, the voice function of the local device is turned on.

When the name of the local device is the same as those of other display apparatuses, the local device needs to be renamed. The specific implementation process may refer to the content of steps S3204 to S3206 provided in the above-mentioned embodiments, which will not be repeated herein.

When the naming of the local device is completed and there is no other display apparatus with the duplicate name under the same user account, the voice function of the local device may be turned on again, and the display apparatus may be controlled through voice interaction.

It can be seen that when the currently logged-in display apparatus has the duplicate name as the local device and has not been renamed, the currently logged-in display apparatus replaces the name, the local device may receive an alert that the name has been replaced because the voice function has been turned on, and at this time, in order to ensure the normal use of the voice function of the local device, the operation for turning on the voice function of the local device again needs to be performed. That is to say, in this case, it is necessary to indicate the user to reset the voice function and rename the local device at the same time.

When the name of the local device is replaced, the voice function of the local device will be turned off. If the alert is inaccurate, for example, only a renaming operation is indicated, that the voice function is turned off is not indicated, and it will cause an erroneous information alert to the user, resulting in the user being unable to accurately learn the true reason why the voice function is unavailable. Even if the user did not reset the voice function finally, the user has clearly learned that the voice function of the local device is turned off, so that if the user wants to use the voice function in the future, the user may perform a turnon operation to reset the voice function, and the condition that the voice function is unavailable and the user does not know the reason is avoided. It can be seen that, at the same time, the user is indicated to reset the voice function and rename the local device. The normal use of the voice function of the local device may be ensured, and the user experience is improved.

According to the display apparatus provided by the embodiment of the present disclosure, when the currently logged-in display apparatus with the duplicate name as the local device exists under the user account, if the currently logged-in display apparatus is not renamed, the name of the local device is replaced, and if the voice function of the local device is not turned on, when the voice function is turned on, the operation of naming the local device is performed; and if the voice function of the local device is turned on, the voice function is turned off when the name is replaced, and the user is indicated to the turn on the voice function. If the user turns on the voice function again, the operation of naming the local device is performed. After the local device is renamed, whether there are other display apparatuses with the duplicate name under the same user account is detected, and the voice function of the local device is turned on when no other display apparatus with the duplicate name under the same user account exists. It can be seen that according to the display apparatus provided by the embodiment of the present disclosure, the display apparatus is named when the voice function is turned on, the voice function is turned on after it is detected that there is no duplication of name, the condition that the voice function of the display apparatus is unavailable due to the duplication problem is avoided, and the user experience is better.

The present disclosure further provides a method for detecting duplicate names of a display apparatus, the method is executed by the controller in the display apparatus provided by the above-mentioned embodiments, and the method includes the following.

When a currently logged-in display apparatus with a duplicate name as a local device under a user account, and the currently logged-in display apparatus is not renamed, if a voice function of the local device is turned on, the local device is named, when it is detected that there is no other display apparatus with the duplicate name under the user account, the voice function of the local device is turned on, and the local device refers to a device which has been logged in with the user account and has not turned on the voice function.

FIG. 34 is a flowchart of a duplicate name detection method of a display apparatus according to some embodiments. Referring to FIG. 34, the present disclosure further provides a duplicate name detection method of a display apparatus, the method is executed by the controller in the display apparatus provided by the above-mentioned embodiments, and the method includes the following.

S21, when there is the currently logged-in display apparatus with the duplicate name as the local device under the user account, and the currently logged-in display apparatus is not renamed, the name replacement instruction sent by the currently logged-in display apparatus is received, wherein the local device refers to the device which has been logged in with the user account and turned on the voice function.

S22, in response to the name replacement instruction, the voice function of the local device is turned off, and the voice function turnoff alert interface is generated and displayed on the display, wherein the voice function turnoff alert interface is configured to indicate that the voice function of the local device is turned off.

S23, if the voice function of the local device is turned on again based on the voice function turnoff alert interface, the local device is named, and when it is detected that there is no other display apparatus with the duplicate name under the user account, turning on of the voice function of the local device is realized.

The present disclosure further provides a computer-readable non-volatile storage medium, wherein the storage medium may store programs, and the programs may include part or all steps in various embodiments of a control button customization method and startup method provided by the present disclosure when the programs are executed. The storage medium may be a magnetic disk, an optical disk, a read-only memory (ROM) or a random access memory (RAM), etc.

What is claimed is:
1. A display apparatus, comprising:
a display; and
a controller; wherein the controller is provided with a voice assistant application and is configured to:
receive, by the voice assistant application, a user voice, wherein the user voice comprises one of a channel name and a channel number;
send the user voice to a voice assistant server;
in response to a channel switch instruction sent from the voice assistant server according to the user voice, receive an audio and video signal transmitted by a channel corresponding to the channel switch instruction; and
play the audio and video signal from the channel corresponding to the channel switch instruction;
wherein the controller is further configured to:
count how many times a channel has been called; and
write corresponding channel numbers and/or channel names and channels into a channel list in descending order in terms of the times the channel has been called, and
wherein the controller is further configured to:
traverse the channel list in response to the channel switch instruction;
while traversing the channel list, calculate similarities between the channel switch instruction and channel names in the channel list or between the channel switch instruction and channel numbers in the channel list;
compare a calculated similarity with a preset similarity;
in response to a first similarity being greater than the preset similarity, terminate the traversing of the channel list before using a first channel corresponding to the first similarity as the channel corresponding to the channel switch instruction; and
in response to no calculated similarity being greater than the preset similarity after the traversing of the channel list, control the display apparatus to display alert information indicating that no channel matched with the user voice is found for a user.
2. The display apparatus according to claim 1, wherein:
the channel list comprises a first sublist and a second sublist; the first sublist is configured to record a correspondence relation between the channel numbers and the channels; the second sublist is configured to record a correspondence relation between the channel names and the channels;
the channel switch instruction comprises a channel identifier; and
the controller is further configured to:
traverse the first sublist in response to determining that the channel switch instruction sent from the voice assistant server comprises a first identifier; and traverse the second sublist in response to determining that the channel switch instruction sent from the voice assistant server comprises a second identifier.
3. The display apparatus according to claim 1, wherein the channel name in the channel list comprises at least one of: a full name of a channel, a short name of the channel, or a like name of the channel.

4. A signal transmission method for a display apparatus, comprising:
- receiving, by the display apparatus, a user voice, wherein the user voice comprises a channel name or a channel number;
- sending, by a voice assistant application of the display apparatus, the user voice to a voice assistant server;
- in response to a channel switch instruction sent from the voice assistant server according to the user voice, receiving an audio and video signal transmitted by a channel corresponding to the channel switch instruction; and
- playing the audio and video signal from the channel corresponding to the channel switch instruction;
- counting how many times a channel has been called; and
- writing corresponding channel numbers and/or channel names and channels into a channel list in descending order in terms of the times the channel has been called, the method further comprising:
- traversing the channel list in response to the channel switch instruction;
- while traversing the channel list, calculating similarities between the channel switch instruction and channel names in the channel list or between the channel switch instruction and channel numbers in the channel list;
- comparing a calculated similarity with a preset similarity;
- in response to a first similarity being greater than the preset similarity, terminating the traversing of the channel list before using a first channel corresponding to the first similarity as the channel corresponding to the channel switch instruction; and
- in response to no calculated similarity being greater than the preset similarity after the traversing of the channel list, controlling the display apparatus to display alert information indicating that no channel matched with the user voice is found for a user.

5. The method according to claim 4, wherein the channel list comprises a first sublist and a second sublist; the first sublist is configured to record a correspondence relation between the channel numbers and the channels; the second sublist is configured to record a correspondence relation between the channel names and the channels; and the channel switch instruction comprises a channel identifier; and the method further comprises:
- traversing the first sublist in response to determining that the channel switch instruction sent from the voice assistant server comprises a first identifier; and traversing the second sublist in response to determining that the channel switch instruction sent from the voice assistant server comprises a second identifier.

6. The method according to claim 4, wherein a channel name in the channel list comprises at least one of: a full name of a channel, a short name of the channel, or a like name of the channel.

7. The display apparatus according to claim 1, wherein the controller is further configured to terminate the traversing of the channel list, upon a finding of the first similarity being greater than the preset similarity.

8. The method according to claim 4, wherein the terminating of the traversing of the channel list is performed, upon a finding of the first similarity being greater than the preset similarity.

* * * * *